United States Patent
Grice et al.

(10) Patent No.: US 10,837,480 B2
(45) Date of Patent: Nov. 17, 2020

(54) HOLLOW WALL ANCHOR

(71) Applicant: THE HILLMAN GROUP, INC., Cincinnati, OH (US)

(72) Inventors: Byron K. Grice, Phoenix, AZ (US); Wayne R. Mayville, Phoenix, AZ (US); Michael J. Schmidt, Gilbert, AZ (US); Jordan D. Shoenhair, Phoenix, AZ (US); Gary J. Schorr, Mesa, AZ (US)

(73) Assignee: THE HILLMAN GROUP, INC., Cincinnati, OH (US)

( * ) Notice: Subject to any disclaimer, the term of this patent is extended or adjusted under 35 U.S.C. 154(b) by 92 days.

(21) Appl. No.: 15/845,069

(22) Filed: Dec. 18, 2017

(65) Prior Publication Data
US 2018/0180080 A1 Jun. 28, 2018

Related U.S. Application Data

(60) Provisional application No. 62/511,406, filed on May 26, 2017, provisional application No. 62/438,082, filed on Dec. 22, 2016.

(51) Int. Cl.
| | |
|---|---|
| *F16B 13/06* | (2006.01) |
| *F16B 37/04* | (2006.01) |
| *F16B 13/00* | (2006.01) |
| *F16B 37/06* | (2006.01) |

(52) U.S. Cl.
CPC .......... *F16B 13/003* (2013.01); *F16B 37/067* (2013.01)

(58) Field of Classification Search
CPC .... F16B 13/002; F16B 19/083; F16B 13/003; F16B 13/065; F16B 13/067

USPC .......................................................... 411/29
See application file for complete search history.

(56) References Cited

U.S. PATENT DOCUMENTS

| | | |
|---|---|---|
| 549,069 A | 10/1895 | Lever |
| 918,063 A | 4/1909 | Klahre |
| 991,427 A | 5/1911 | Glements |
| 1,031,462 A | 7/1912 | Paine |
| 1,084,284 A | 1/1914 | Merrill |
| 1,145,423 A | 7/1915 | Joseph |
| 1,352,919 A | 9/1920 | Salmons |

(Continued)

FOREIGN PATENT DOCUMENTS

WO  WO2017072429 A1  5/2017

*Primary Examiner* — Flemming Saether
(74) *Attorney, Agent, or Firm* — Thompson Hine LLP

(57) ABSTRACT

A hollow wall anchor includes a wall penetrating component having an externally threaded portion and a wall penetrating end portion, and a body component having a wall face engaging portion and an internally threaded portion that receives the externally threaded portion of the wall penetrating component. Rotation of the components together in a first direction for wall penetration moves both the wall penetrating component and the body component into the wall until the wall face engaging portion of the body component engages the wall to limit further rotation of the body component while the wall penetrating component continues to rotate such that interacting threads of the two components pull the wall penetrating component further into the body component. As the wall penetrating component is pulled further into the body component one or more retention arms are expanded outwardly behind a rear surface of the wall.

17 Claims, 44 Drawing Sheets

(56) References Cited

U.S. PATENT DOCUMENTS

| | | | | |
|---|---|---|---|---|
| 1,373,188 | A | 5/1921 | Goewe | |
| 1,386,202 | A | 8/1921 | Peterson | |
| 1,409,626 | A | 3/1922 | Walther | |
| 1,516,242 | A | 11/1924 | Peirce | |
| 1,733,693 | A | 10/1929 | Porter | |
| 1,738,133 | A | 12/1929 | Anderson | |
| 2,203,146 | A | 6/1940 | Hexdall | |
| 2,519,511 | A | 8/1950 | Stelter | |
| 2,532,040 | A | 11/1950 | Seely | |
| 2,887,002 | A | 5/1959 | McAfee | |
| 2,913,953 | A | 11/1959 | Tendler | |
| 2,916,235 | A | 12/1959 | Wilhelm | |
| 3,168,850 | A | 2/1965 | Tennican | |
| 3,248,994 | A | 5/1966 | Aackersberg | |
| 3,385,156 | A | 5/1968 | Polos | |
| 3,403,593 | A * | 10/1968 | Moore | F16B 19/083 411/29 |
| 3,534,650 | A | 10/1970 | Kubokawa | |
| 3,673,910 | A | 7/1972 | Collister | |
| 3,861,267 | A | 1/1975 | Collister | |
| 3,980,329 | A | 9/1976 | Coe | |
| 4,196,883 | A | 4/1980 | Einhorn | |
| 4,283,986 | A | 8/1981 | Peterson | |
| 4,285,264 | A | 8/1981 | Einhorn | |
| 4,293,259 | A | 10/1981 | Liebig | |
| 4,388,031 | A * | 6/1983 | Rodgers | F16B 19/086 411/344 |
| 4,398,855 | A | 8/1983 | Hultquist | |
| 4,502,826 | A | 3/1985 | Fafard | |
| 4,601,625 | A | 7/1986 | Ernst | |
| 4,648,767 | A | 3/1987 | Fischer | |
| 4,763,456 | A | 8/1988 | Giannuzzi | |
| 4,892,429 | A | 1/1990 | Giannuzzi | |
| 4,920,833 | A * | 5/1990 | Rosenthal | B25B 27/0014 411/29 |
| 4,984,946 | A * | 1/1991 | Phillips, II | B29C 45/16 411/183 |
| 5,039,262 | A | 8/1991 | Giannuzzi | |
| 5,046,693 | A | 9/1991 | Browne | |
| 5,160,225 | A | 11/1992 | Chern | |
| 5,183,357 | A * | 2/1993 | Palm | F16B 19/083 411/29 |
| 5,190,425 | A | 3/1993 | Wieder | |
| 5,234,299 | A | 8/1993 | Giannuzzi | |
| 5,246,323 | A * | 9/1993 | Vernet | F16B 13/061 411/29 |
| 5,267,423 | A | 12/1993 | Giannuzzi | |
| 5,308,203 | A | 5/1994 | McSherry | |
| 5,383,753 | A * | 1/1995 | Palm | F16B 5/04 411/29 |
| 5,413,444 | A | 5/1995 | Thomas | |
| 5,417,531 | A | 5/1995 | Brown | |
| 5,449,257 | A | 9/1995 | Giannuzzi | |
| 5,482,418 | A | 1/1996 | Giannuzzi | |
| 5,529,449 | A | 6/1996 | McSherry | |
| 5,536,121 | A | 7/1996 | McSherry | |
| 5,558,479 | A | 9/1996 | McElderry | |
| 5,625,994 | A | 5/1997 | Giannuzzi | |
| 5,630,688 | A | 5/1997 | Tran | |
| 5,692,864 | A | 12/1997 | Powell | |
| 5,749,687 | A | 5/1998 | Kilgore | |
| 5,752,792 | A | 5/1998 | McSherry | |
| 5,762,456 | A | 6/1998 | Aasgaard | |
| 5,833,415 | A | 11/1998 | McSherry | |
| 5,944,295 | A | 8/1999 | McSherry | |
| 5,944,466 | A | 8/1999 | Rudnicki | |
| 6,079,921 | A | 6/2000 | Gauthier | |
| 6,139,236 | A | 10/2000 | Ito | |
| 6,186,716 | B1 | 2/2001 | West | |
| 6,196,780 | B1 | 3/2001 | Wakai | |
| 6,354,779 | B1 | 3/2002 | West | |
| 6,382,892 | B1 | 5/2002 | Hempfling | |
| D462,895 | S | 9/2002 | Gaudron | |
| 6,679,661 | B2 | 1/2004 | Huang | |
| 6,884,012 | B2 | 4/2005 | Panasik | |
| 6,896,462 | B2 | 5/2005 | Stevenson | |
| 7,001,124 | B2 | 2/2006 | Panasik | |
| 7,143,497 | B2 | 12/2006 | Panasik | |
| 7,144,212 | B2 | 12/2006 | Kaye | |
| 7,261,505 | B2 | 8/2007 | Ernst | |
| 7,266,874 | B2 | 9/2007 | Ernst | |
| 7,290,972 | B2 | 11/2007 | Gauthier | |
| 7,320,569 | B2 | 1/2008 | Kaye | |
| 7,517,182 | B2 | 4/2009 | Cabrele | |
| D593,141 | S | 5/2009 | Gaudron | |
| 7,547,171 | B2 | 6/2009 | McDuff | |
| 7,611,316 | B2 | 11/2009 | Panasik | |
| D605,933 | S | 12/2009 | Gaudron | |
| 7,654,781 | B2 | 2/2010 | McDuff | |
| 7,736,108 | B1 | 6/2010 | Bruce | |
| 7,762,751 | B2 | 7/2010 | Panasik | |
| 7,815,407 | B2 | 10/2010 | Kucharyson | |
| 7,828,501 | B2 | 11/2010 | Bauer | |
| 7,883,307 | B2 | 2/2011 | Pippard | |
| 7,934,895 | B2 | 5/2011 | Ernst | |
| 7,955,392 | B2 | 6/2011 | Dewey | |
| D642,900 | S | 8/2011 | McDuff | |
| 8,011,080 | B2 | 9/2011 | Brown | |
| 8,057,147 | B2 | 11/2011 | Ernst | |
| 8,128,329 | B2 | 3/2012 | Pilon | |
| 8,192,123 | B2 | 6/2012 | Ernst | |
| 8,235,635 | B1 | 8/2012 | Brown | |
| 8,303,224 | B2 | 11/2012 | McDuff | |
| RE44,016 | E | 2/2013 | Remmers | |
| 8,376,679 | B2 | 2/2013 | Gaudron | |
| 8,444,358 | B2 | 5/2013 | Gaudron | |
| 8,449,236 | B2 | 5/2013 | McDuff | |
| 8,568,075 | B2 | 10/2013 | Gaudron | |
| 8,573,913 | B2 | 11/2013 | McDuff | |
| 8,740,527 | B2 | 6/2014 | Cheng | |
| 8,764,364 | B2 | 7/2014 | Brown | |
| 8,821,094 | B2 | 9/2014 | McDuff | |
| 8,858,143 | B2 | 10/2014 | Gaudron | |
| 8,925,172 | B2 | 1/2015 | English | |
| 9,133,630 | B2 | 9/2015 | Dougherty | |
| 9,353,782 | B2 | 5/2016 | McDuff | |
| 9,587,661 | B2 | 3/2017 | McDuff | |
| 9,593,703 | B2 | 3/2017 | Hakenholt | |
| 10,030,686 | B2 * | 7/2018 | Vivier et al. | B29C 45/14377 |
| 2004/0052606 | A1 | 3/2004 | Kerl | |
| 2004/0208722 | A1 | 10/2004 | Kuenzel | |
| 2004/0223832 | A1 * | 11/2004 | Aasgaard | F16B 19/083 411/501 |
| 2005/0084360 | A1 | 4/2005 | Panasik | |
| 2005/0214095 | A1 | 9/2005 | Brown | |
| 2006/0018730 | A1 | 1/2006 | Ernst | |
| 2006/0127199 | A1 | 6/2006 | Bappert | |
| 2006/0165506 | A1 | 7/2006 | Panasik | |
| 2009/0053007 | A1 | 2/2009 | Rafaeli | |
| 2009/0208310 | A1 | 8/2009 | Ikuta | |
| 2009/0249738 | A1 | 10/2009 | Brereton | |
| 2011/0164941 | A1 | 7/2011 | Snead | |
| 2014/0199132 | A1 | 7/2014 | McDuff | |
| 2014/0328643 | A1 | 11/2014 | DePietro | |
| 2015/0192163 | A1 | 7/2015 | Vivier | |
| 2016/0040704 | A1 | 2/2016 | Yun | |
| 2016/0053893 | A1 | 2/2016 | Denton | |
| 2016/0102696 | A1 | 4/2016 | DeClark | |
| 2017/0051772 | A1 | 2/2017 | McDuff | |
| 2017/0089380 | A1 | 3/2017 | McDuff | |
| 2017/0102020 | A1 | 4/2017 | McDuff | |

* cited by examiner

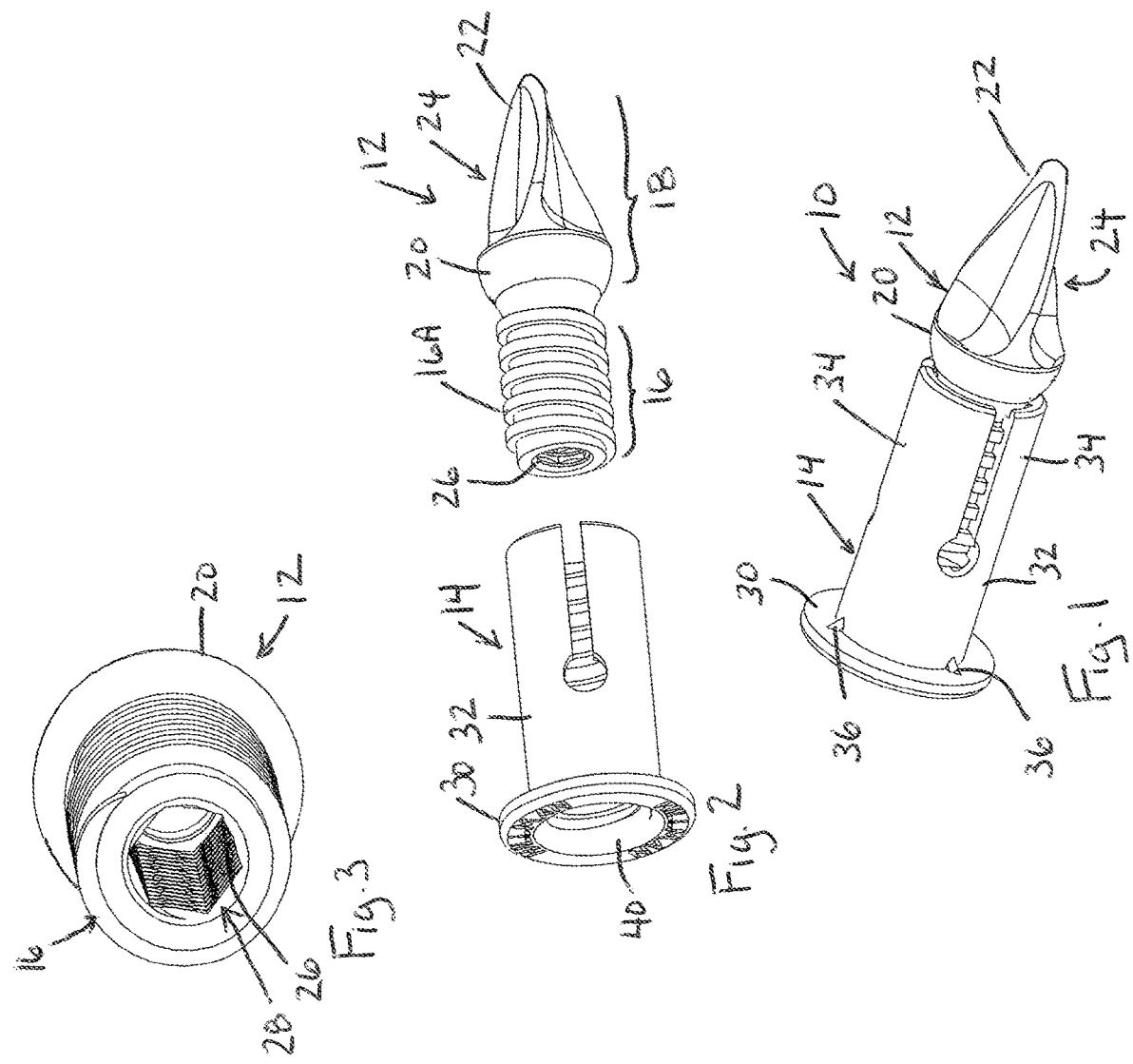

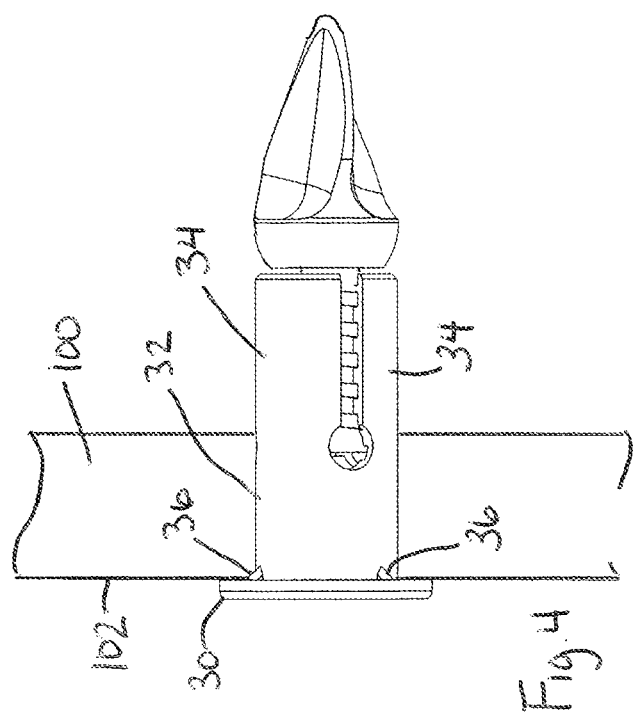

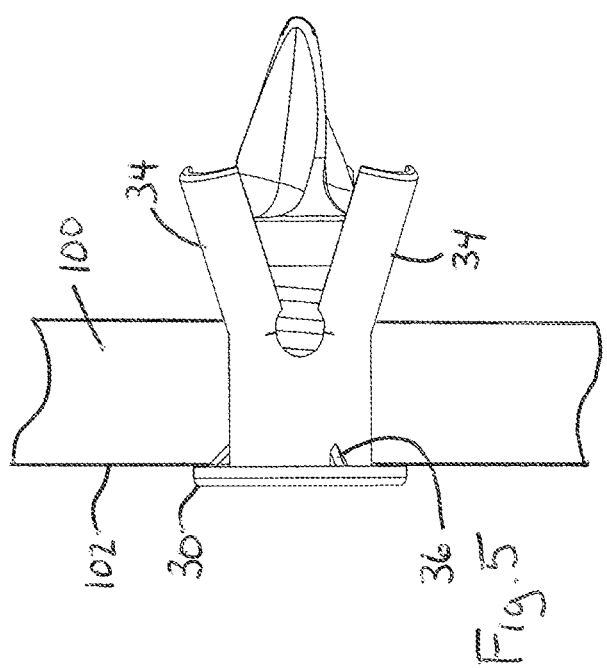

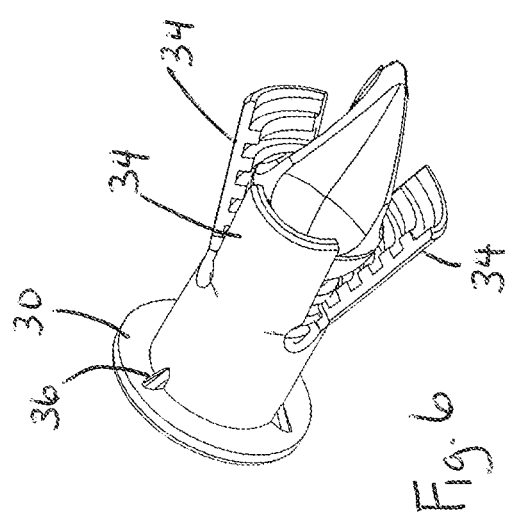

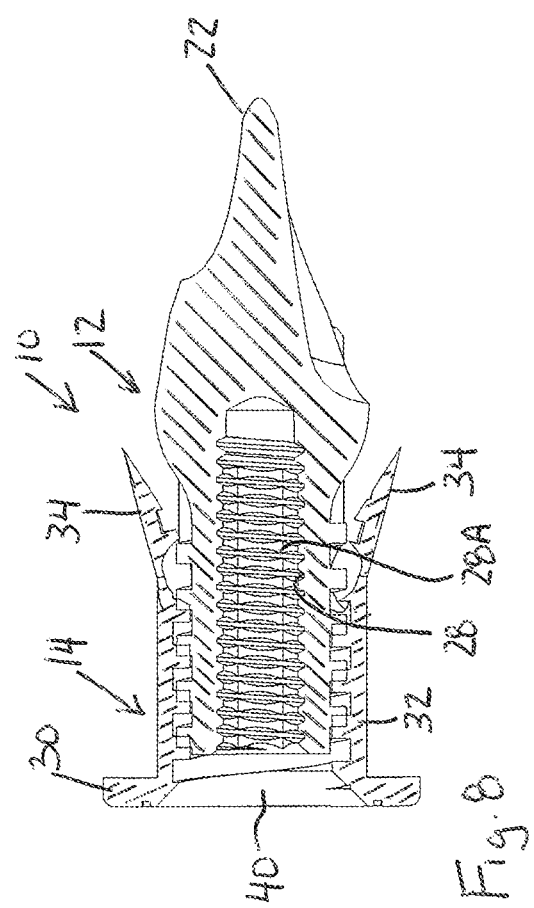

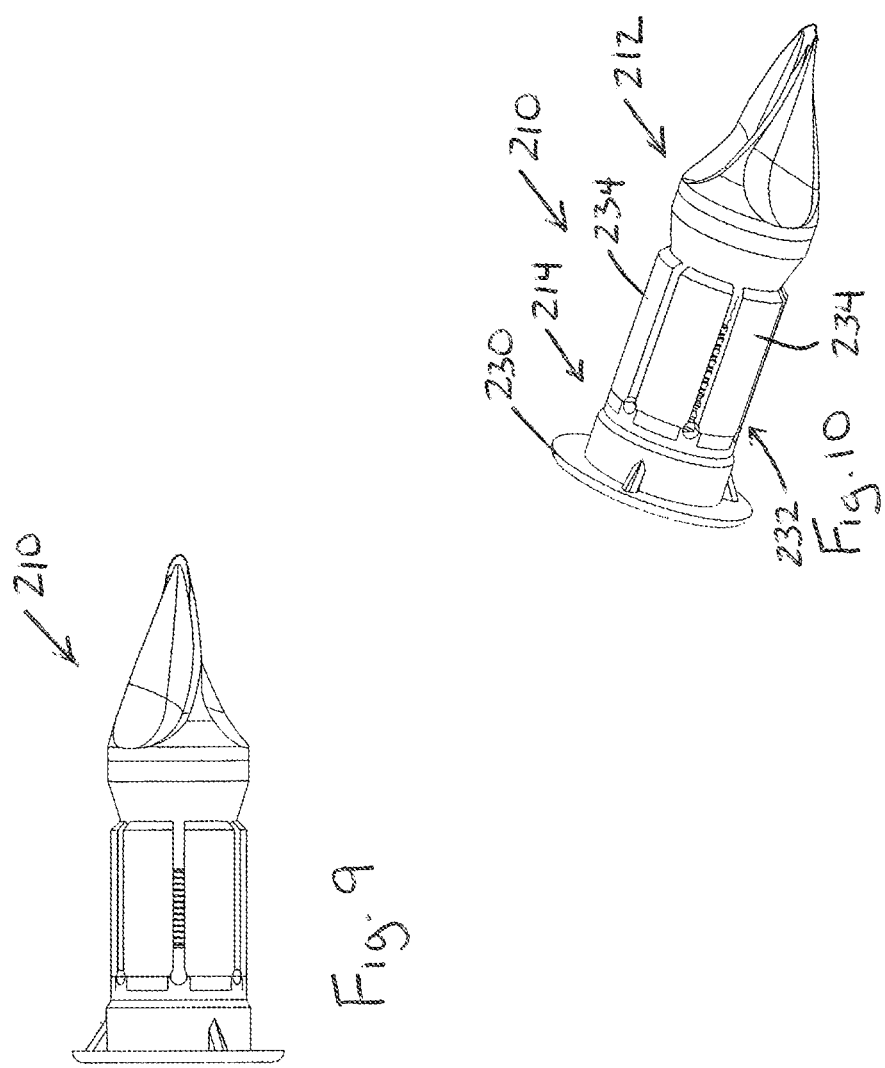

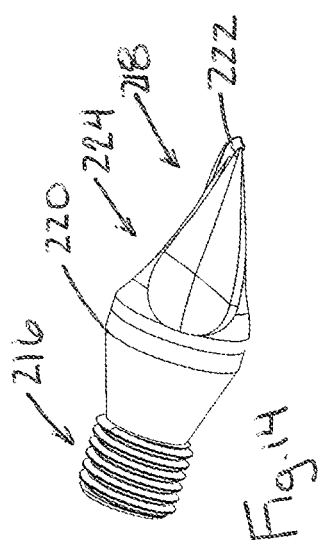
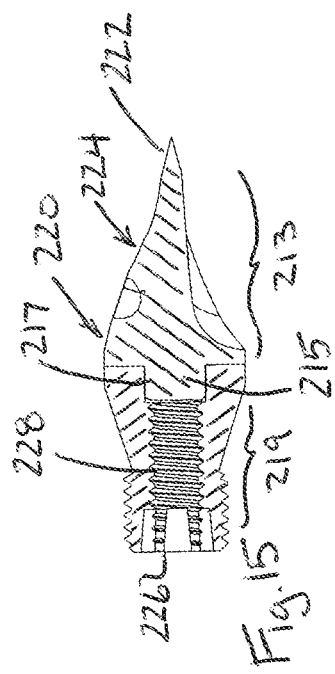
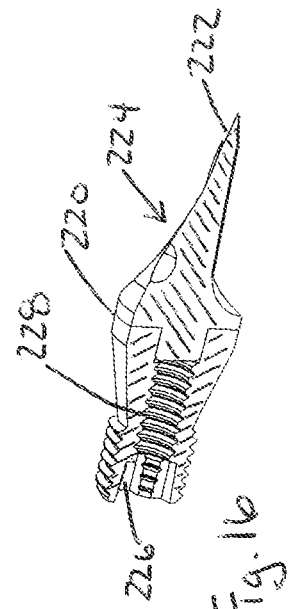

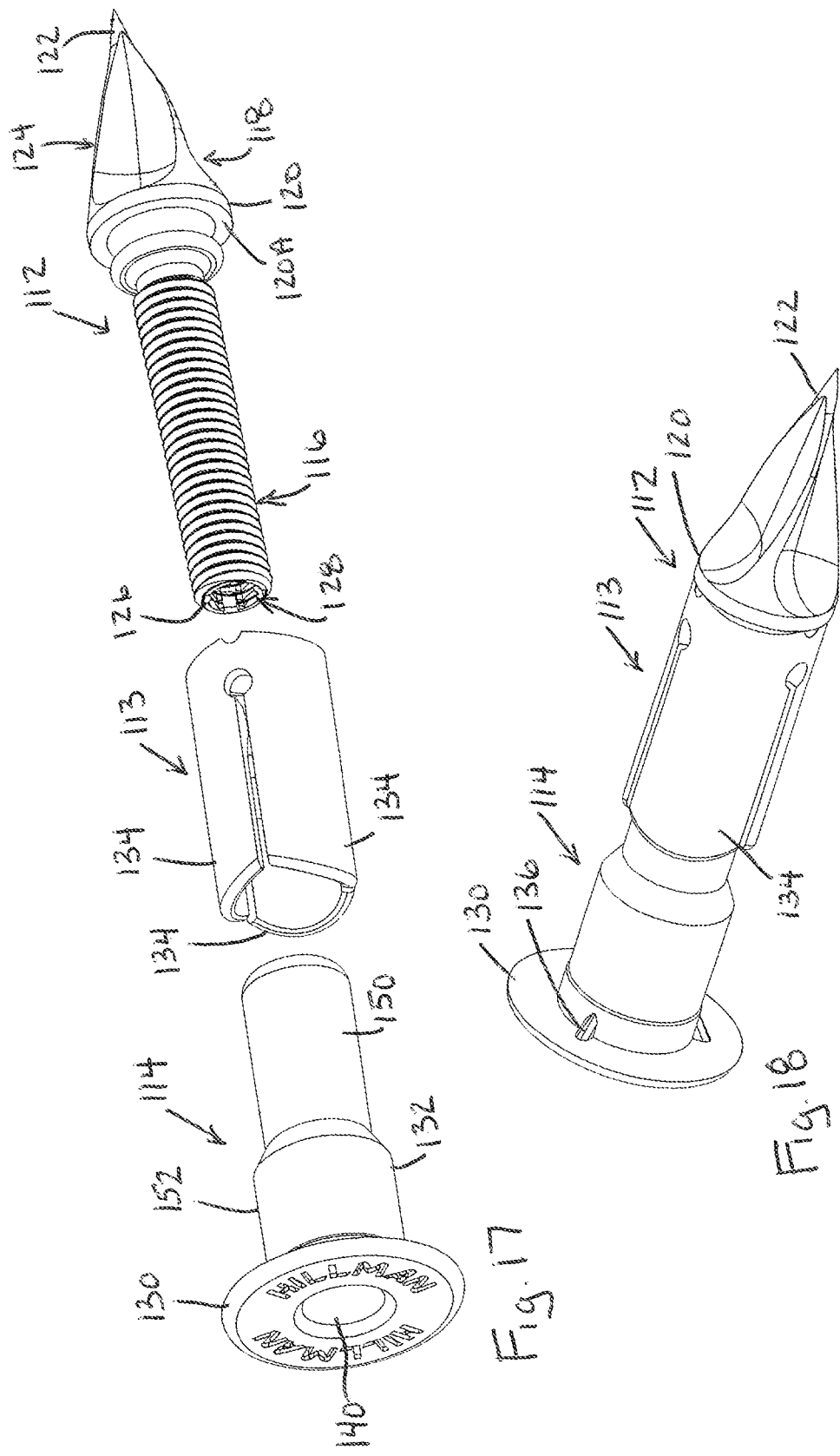

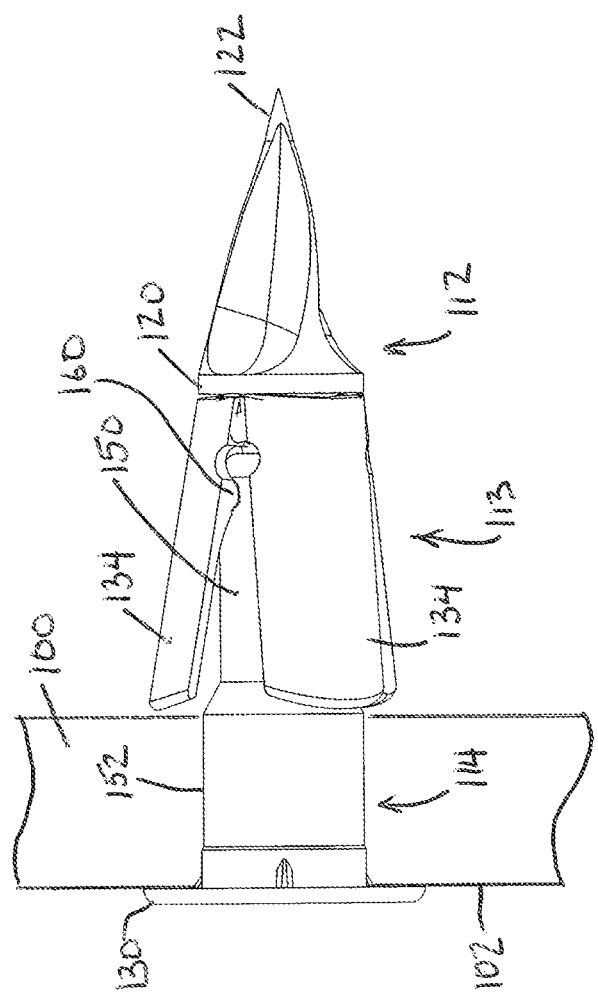

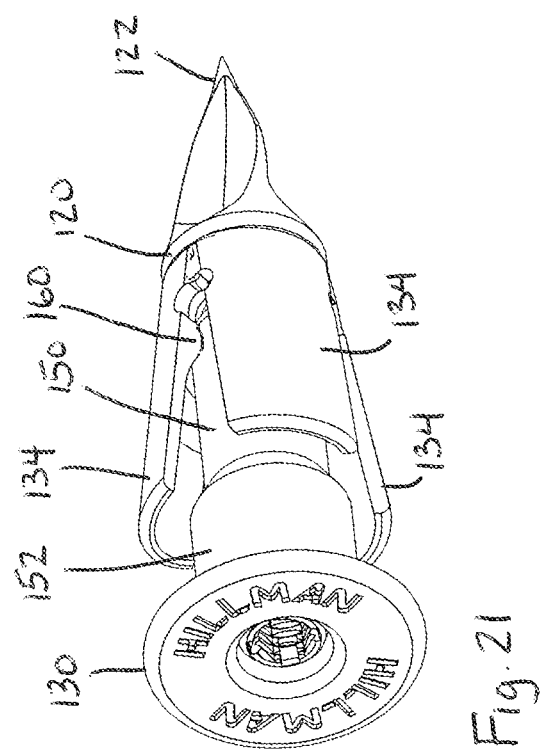

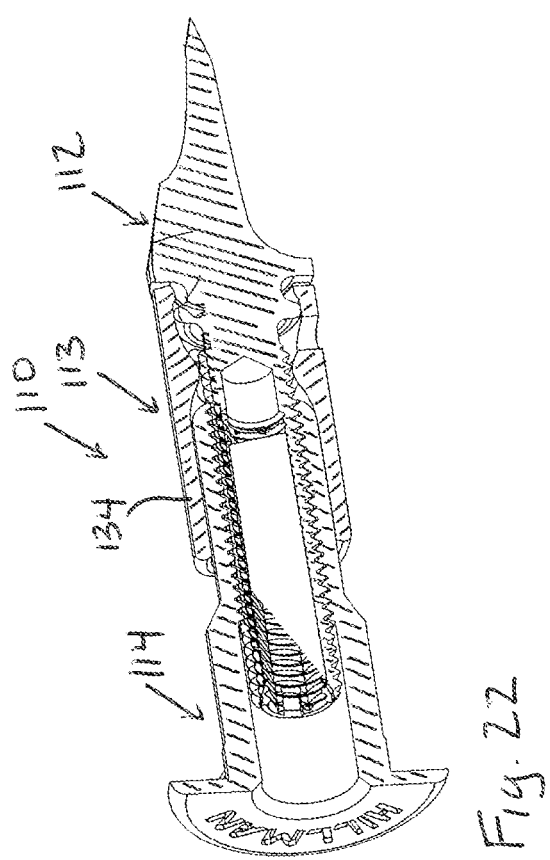

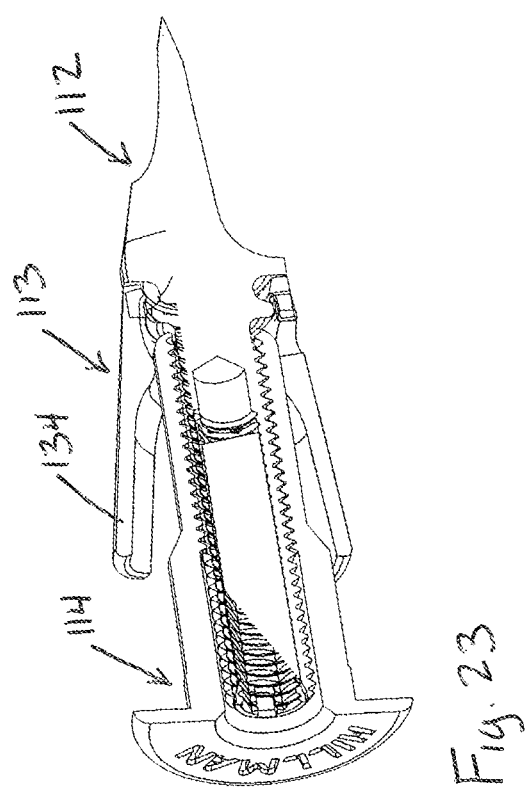

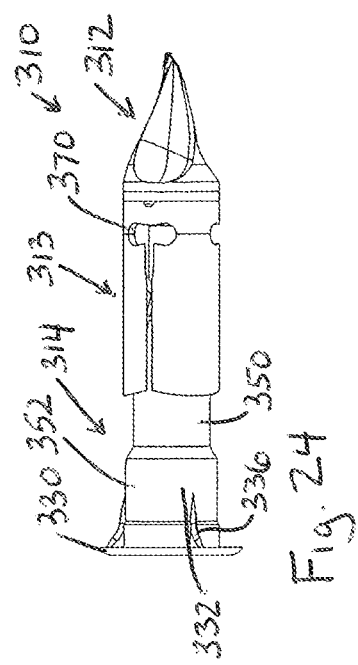
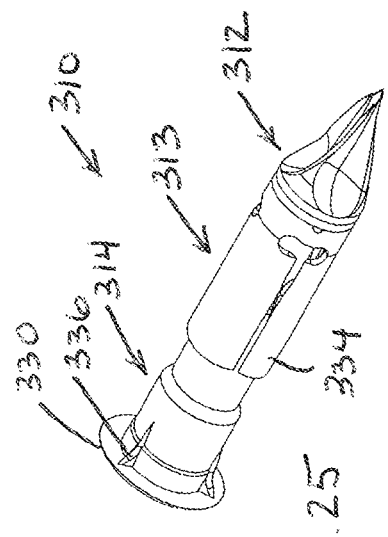

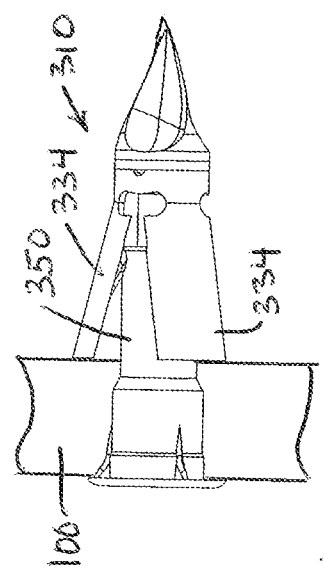
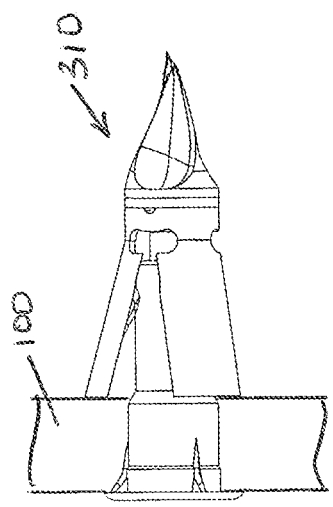
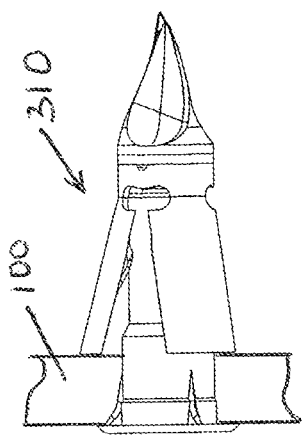
Fig. 26
Fig. 27
Fig. 28

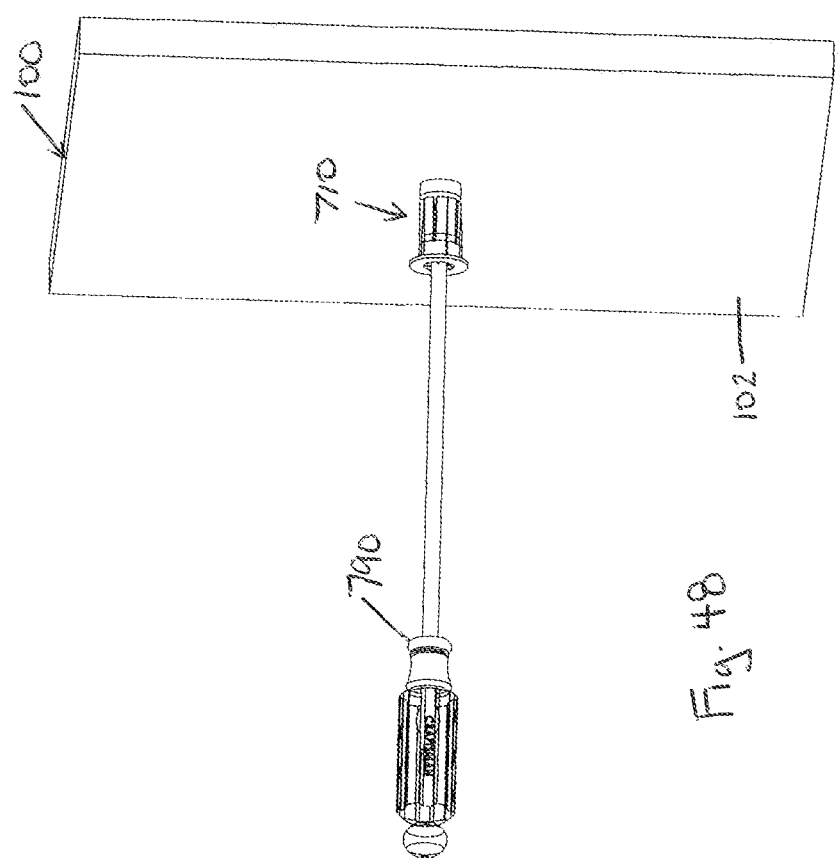

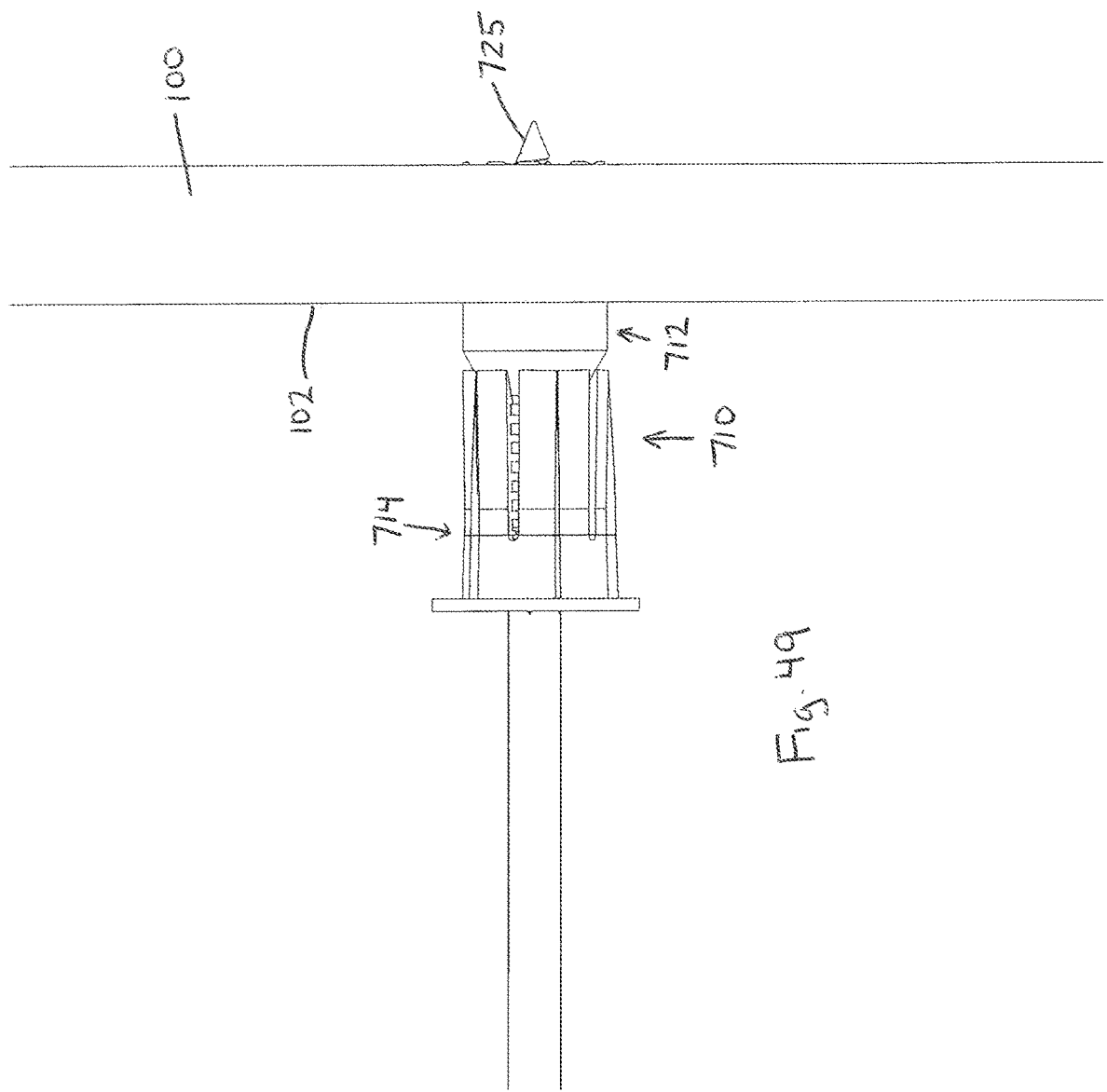

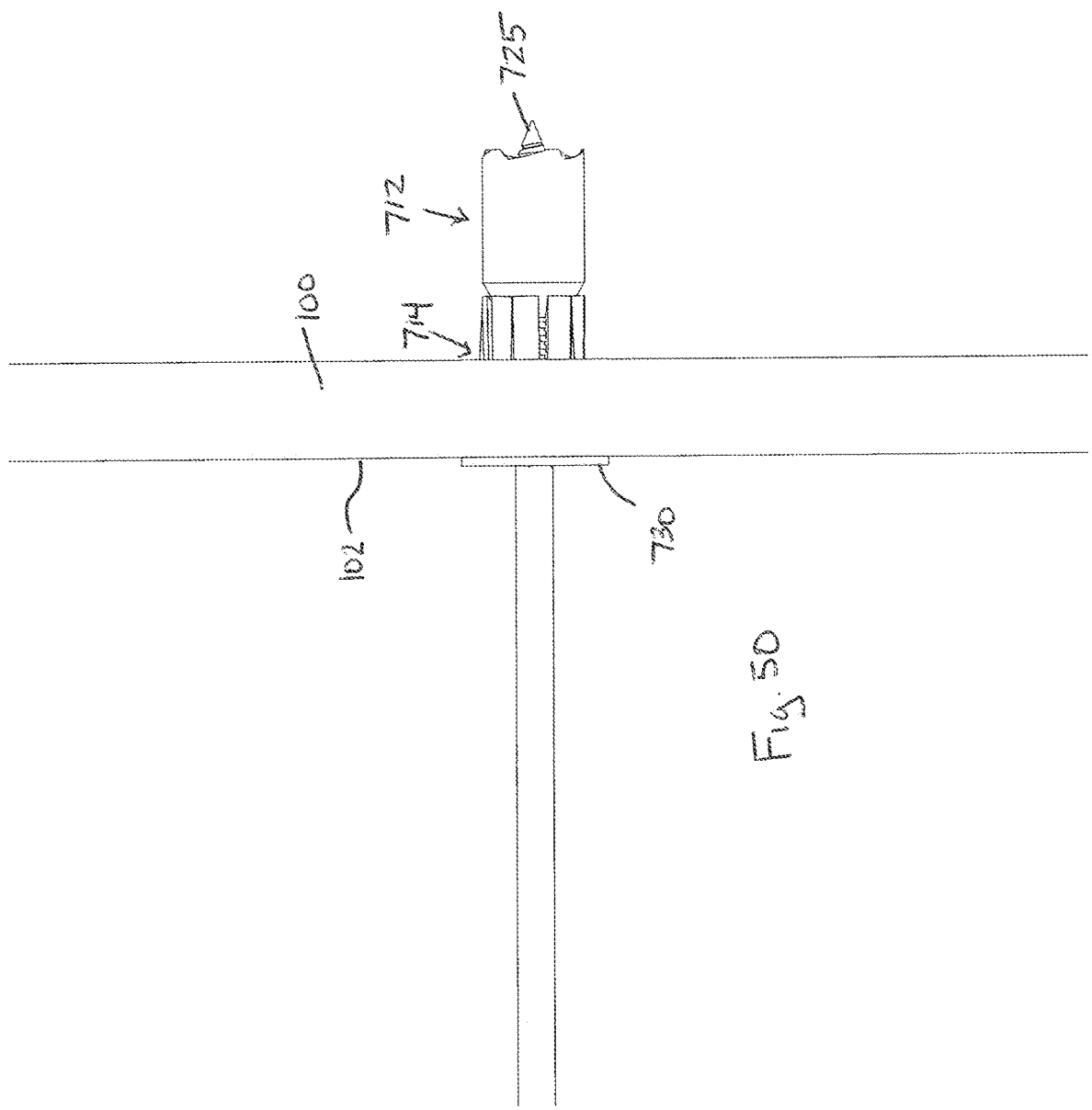

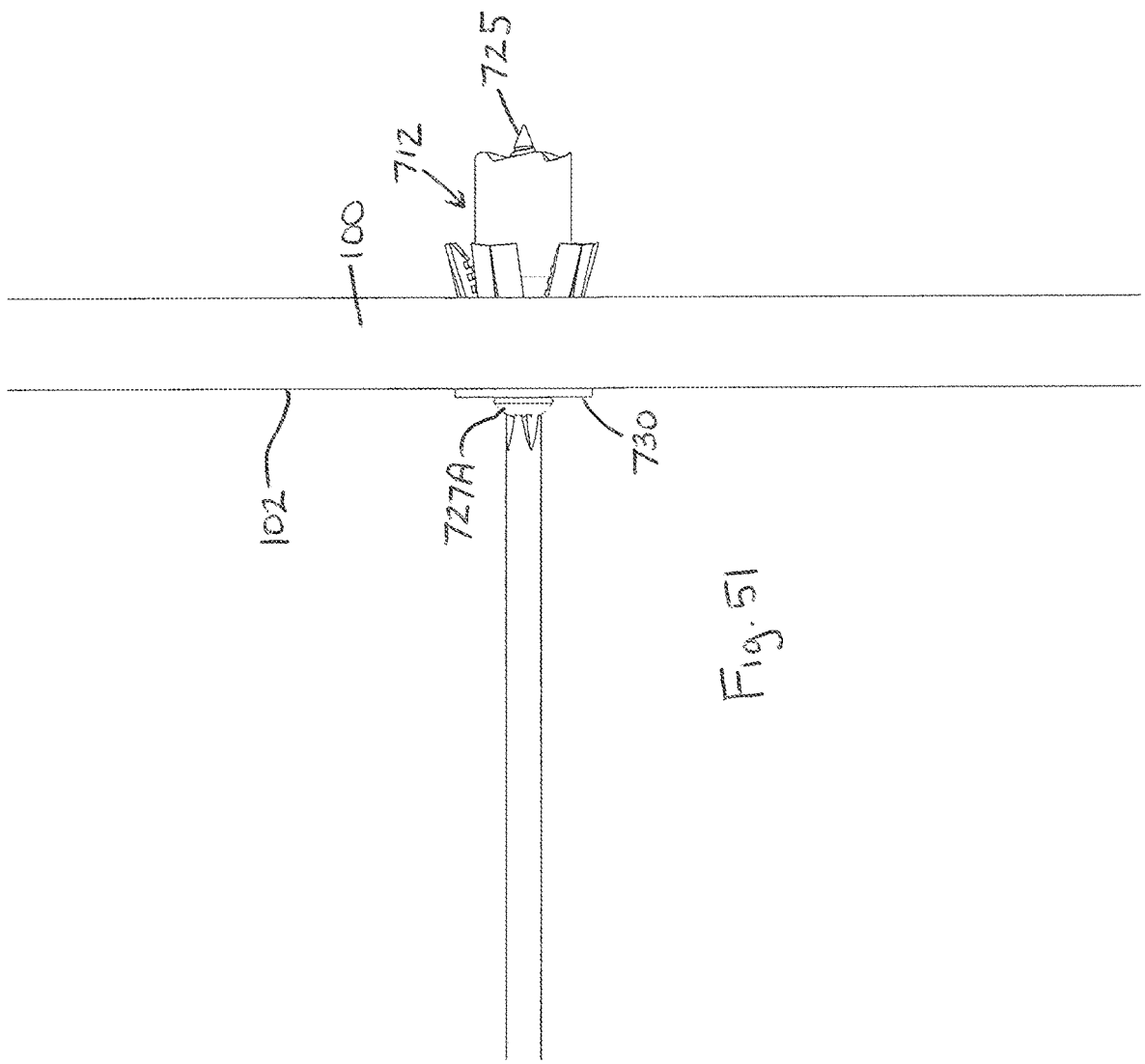

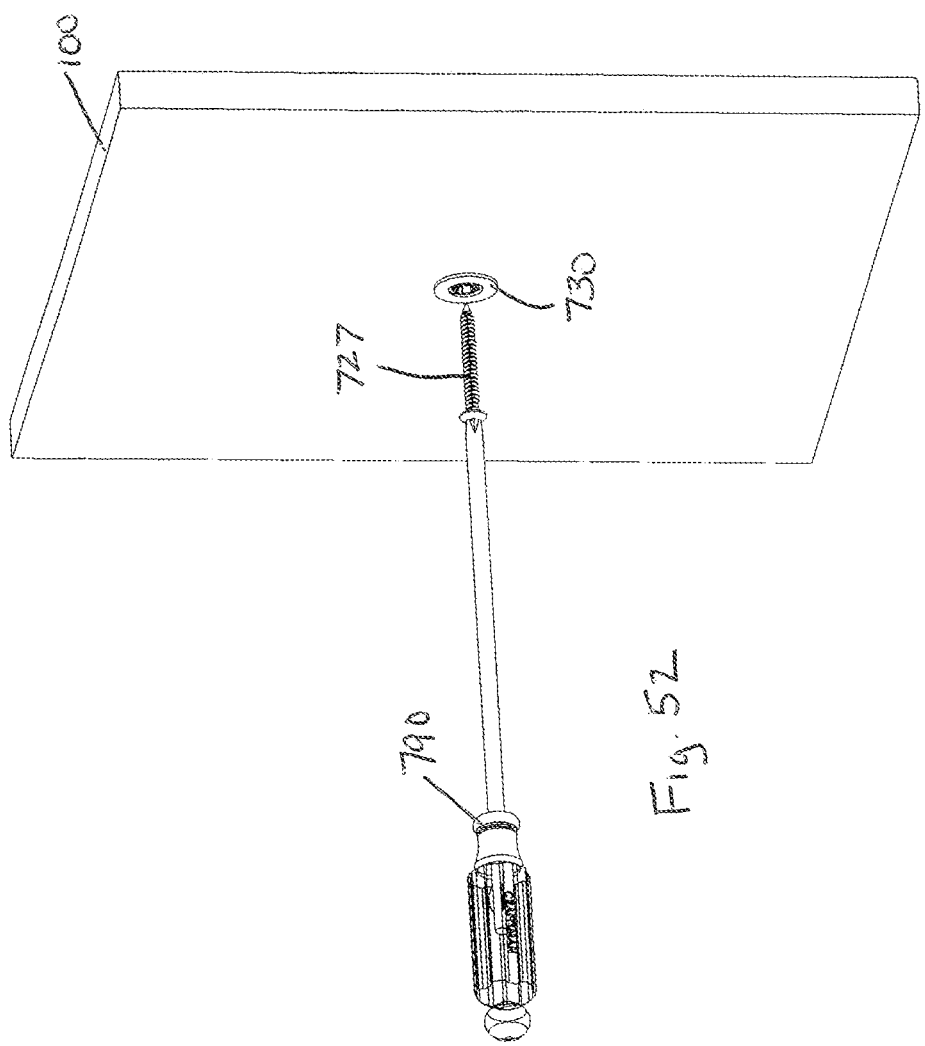

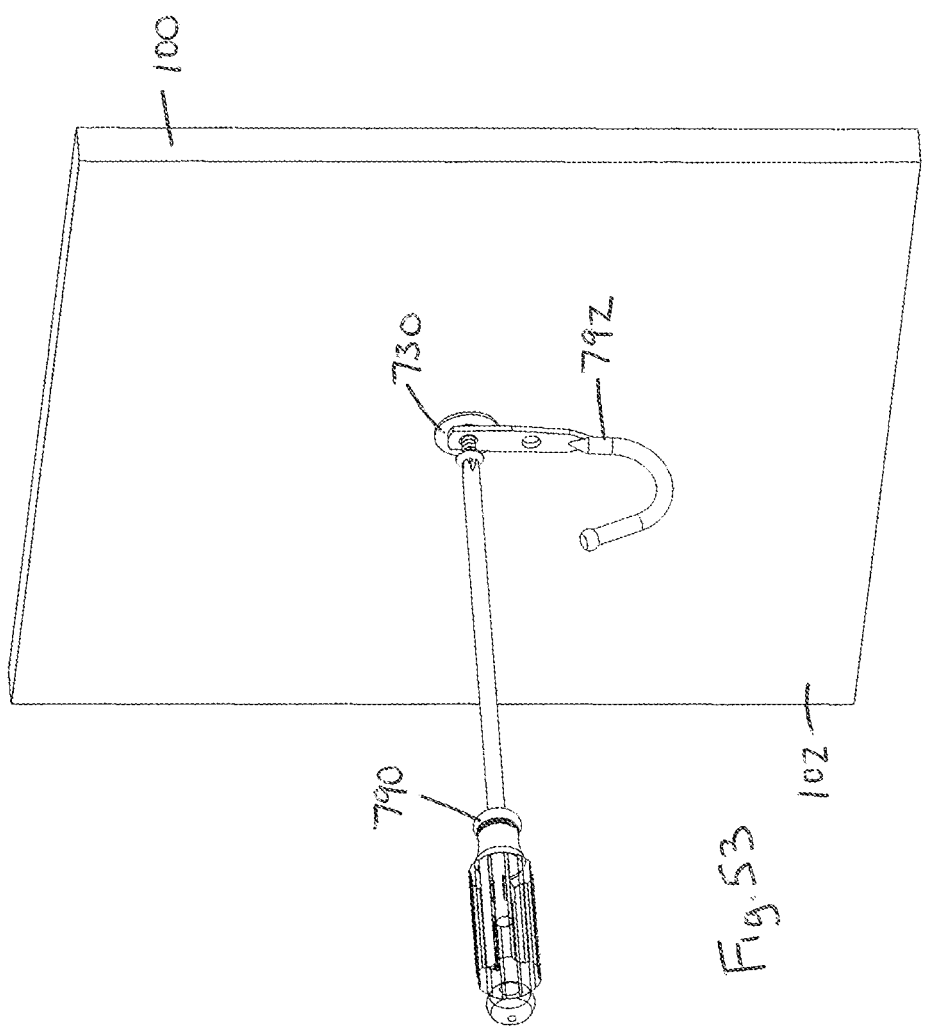

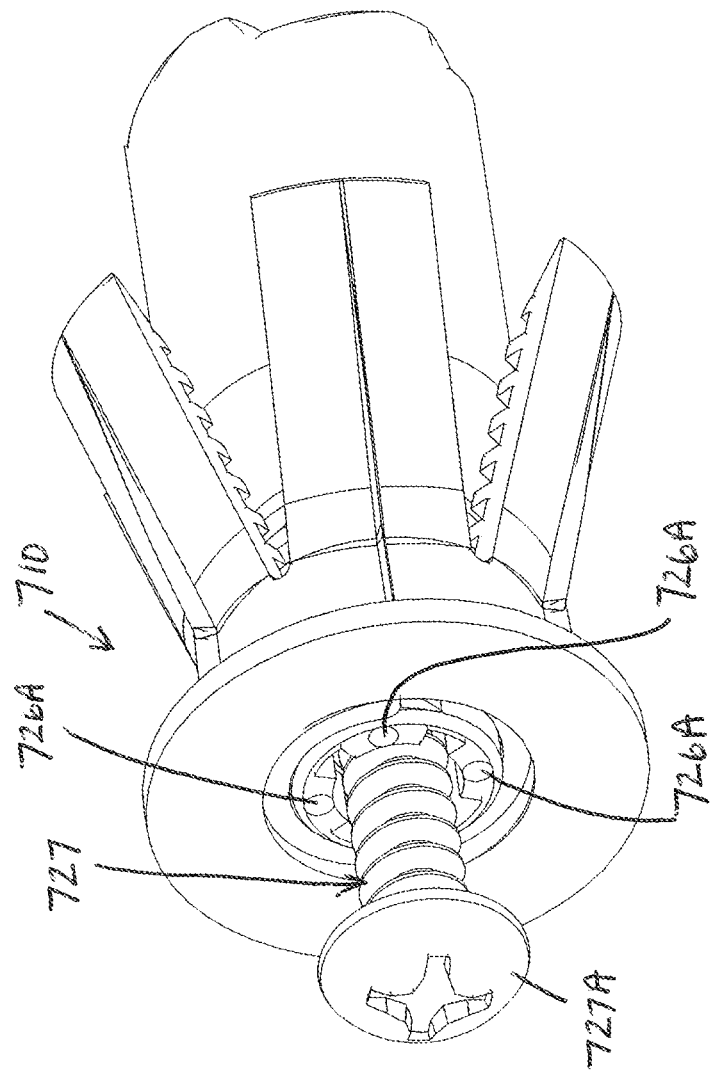

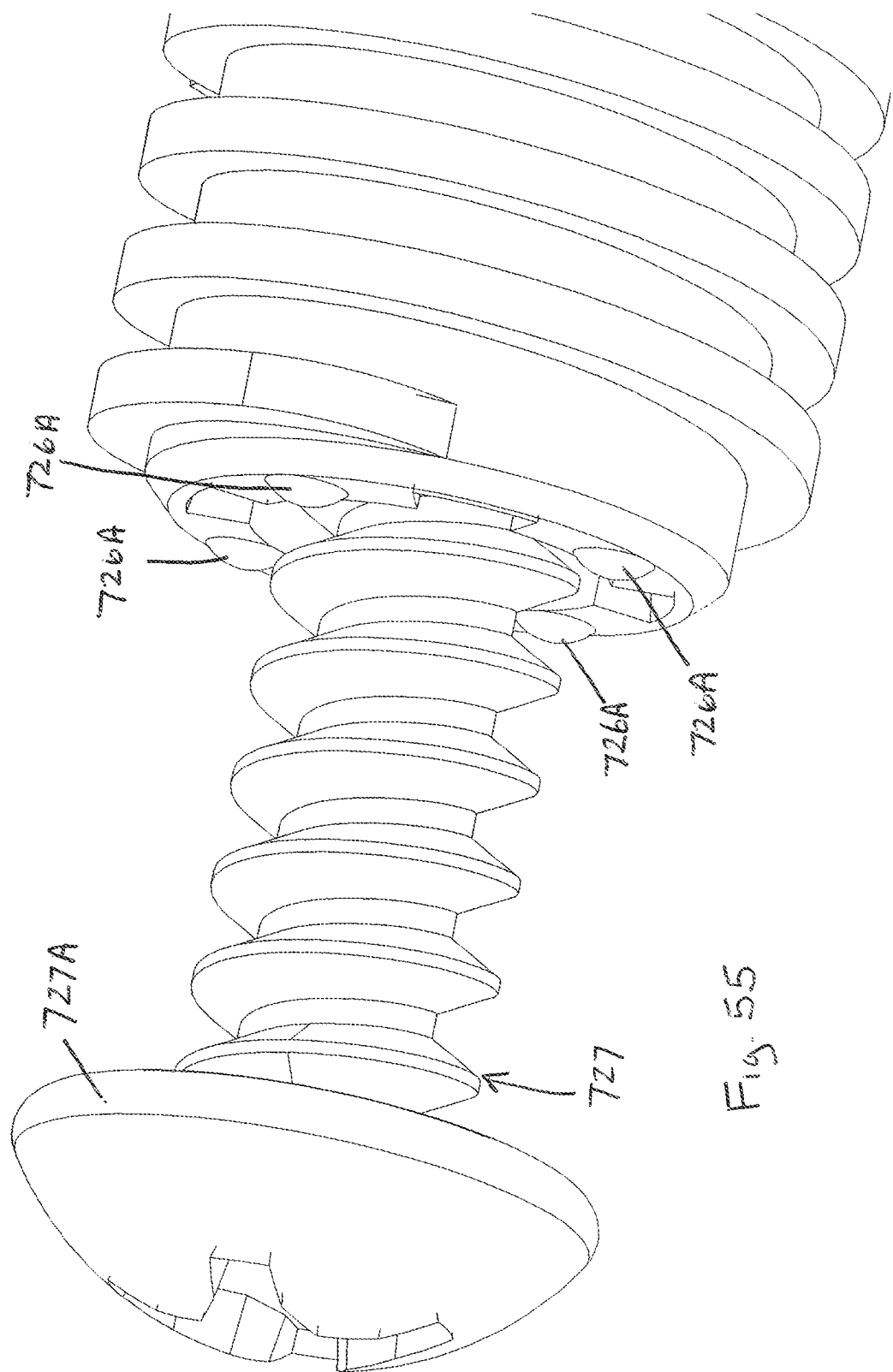

HOLLOW WALL ANCHOR

CROSS-REFERENCES

This application claims the benefit of U.S. Provisional Application Ser. Nos. 62/511,406, filed May 26, 2017, and 62/438,082, filed Dec. 22, 2016, each of which is incorporated herein by reference.

TECHNICAL FIELD

This application relates generally to wall anchors and, more specifically, to hollow wall anchors.

BACKGROUND

A variety of types of hollow wall anchors are known. Some hollow wall anchors require pre-drilling of the wallboard for insertion and operation, while other hollow wall anchors do not require pre-drilling. Generally, user convenience is enhanced by avoiding the need for pre-drilling.

Some hollow wall anchors secure to the core of the wallboard, while other hollow wall anchors secure to the back of the wallboard. Generally, higher loading can typically be achieved with anchors that secure to the back of the wallboard.

It would be desirable to provide an improved hollow wall anchor that provides simple installation, use and removal, while at the same time providing desirable load ratings.

SUMMARY

In one aspect, a hollow wall anchor includes a wall penetrating component having an externally threaded portion and a wall penetrating end portion, and a body component having a wall face engaging portion and an internally threaded portion that receives the externally threaded portion of the wall penetrating component. Rotation of the wall penetrating component and the body component together in a first direction for wall penetration moves both the wall penetrating component and the body component into the wall until the wall face engaging portion of the body component engages the wall to limit further rotation of the body component while the wall penetrating component continues to rotate such that interacting threads of the wall penetrating component and the body component pull the wall penetrating component further into the body component.

In one implementation, as the wall penetrating component is pulled further into the body component one or more retention arms are expanded outwardly behind a rear surface of the wall for retaining the hollow wall anchor within the wall.

The one or more retention arms may be integrally formed with, and remain connected to, the body component. Alternatively, the retention arms may be formed as part of a sleeve component disposed between the body component and the wall penetrating component.

The wall penetrating component may include one of a pointed end for drilling a hole in the wallboard or a cylindrical end edge for coring a hole in wallboard.

In another aspect, a method of installing a hollow wall anchor to a wall involves the steps of: utilizing a hollow wall anchor comprising a wall penetrating component and a body component, the wall penetrating component having an externally threaded portion and a wall penetrating end portion, the body component having a wall face engaging portion and an internally threaded portion that receives the externally threaded portion of the wall penetrating component; engaging the wall penetrating end portion of the wall penetrating component to the wall and rotating the wall penetrating component and the body component together in a clockwise direction to move both the wall penetrating component and the body component into the wall until the wall face engaging portion of the body component engages the wall and limits further rotation of the body component; and thereafter continuing to rotate the wall penetrating component in the clockwise direction relative to the body component such that interacting threads of the wall penetrating component and the body component pull the wall penetrating component further into the body component and such movement causes one or more retention arms to expand outwardly behind a rear surface of the wall for retaining the hollow wall anchor within the wall.

In another aspect, a hollow wall anchor includes a wall penetrating component having an externally threaded portion and a wall penetrating end portion; a body component having a through passage with a forward end and a distal end, wherein at least part of the through passage is internally threaded, wherein the externally threaded portion of the wall penetrating component is received within the distal end of the through passage and threadedly engages the internally threaded part of the through passage, wherein rotation of the wall penetrating component relative to the body component in a first direction pulls the wall penetrating component further into the body component by way of thread interaction; and a plurality of movable retention arms located along the anchor, each retention arm movable between a collapsed install orientation and an expanded retention orientation, wherein as the wall penetrating component is pulled further into the body component each retention arm is shifted from its collapsed install orientation to its expanded retention orientation.

BRIEF DESCRIPTION OF THE DRAWINGS

FIGS. 1-3 show one embodiment of an anchor;
FIG. 4 shows the anchor in a wall before leg expansion;
FIG. 5 shows the anchor in a wall after leg expansion;
FIGS. 6-8 show additional views of the anchor;
FIGS. 9-16 show another embodiment of an anchor;
FIGS. 17-23 show another embodiment of an anchor;
FIGS. 24-31 show another embodiment of an anchor;
FIGS. 47-53 show an install and use sequence for the anchor of FIGS. 44-46;
and
FIGS. 54 and 55 show additional views of the anchor of FIGS. 44-46.

DETAILED DESCRIPTION

Figure 7:
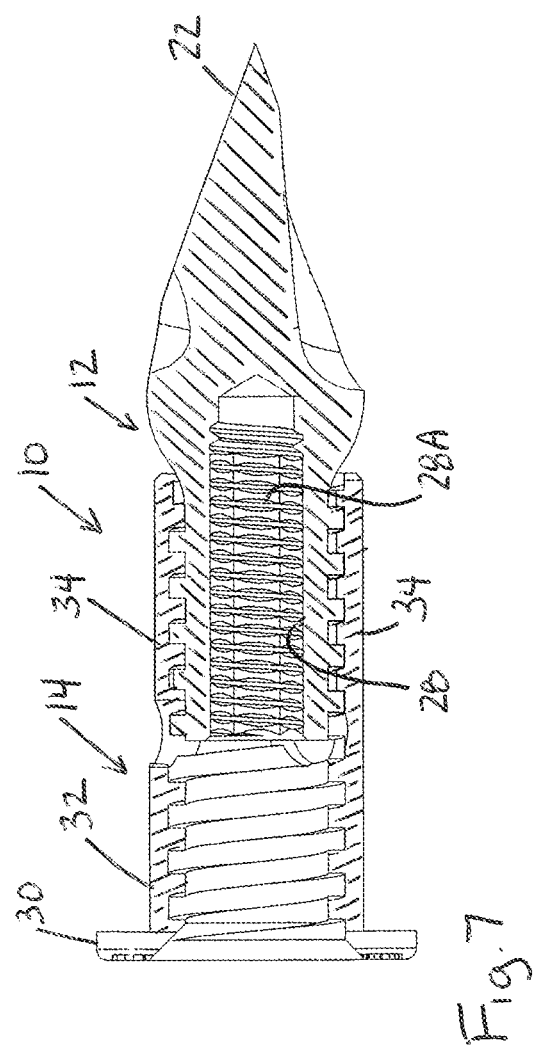

In the drawings and description of various anchor embodiments below, the term wallboard is generally used to refer to the most common wallboard such as drywall, but it is recognized that the anchor components could be suitable for any other friable wallboard material, such as dense corks or foams or other materials that can crumble. Accordingly, the term wallboard as used herein is intended to broadly encompass, for example, both typical drywall (aka plasterboard and gypsum board) and such other friable wallboard materials.

Referring to FIGS. 1-8, one embodiment of a hollow wall anchor 10 is shown, which includes a wall penetrating component 12 and a body component 14. In one implementation, both components are formed of a plastic material, but one or both components could alternatively be formed of other materials, such as metals. The wall penetrating component includes an externally threaded inner end portion 16, with thread 16A, and a wall penetrating distal end portion 18. The wall penetrating end portion 18 includes an enlarged head part 20 and a pointed end 22. A transition region 24 between the pointed end 22 and the enlarged head part 20 is shaped to facilitate wall penetration during rotation. The end portion 16 includes an internal end 26 that has a tool receiving part shaped to enable rotation via a tool (e.g., a hex shape recess, Phillips recess, Torx recess or some other shape). The internal end 26 leads to an internal passage 28 that is also threaded, per thread 28A.

The body component 14 has a wall face engaging portion 30 at one end and an internally threaded tubular portion 32 extending therefrom. The tubular portion 32 receives the externally threaded portion 16 of the wall penetrating component via the mating threads of the two components. The wall penetrating component 12 is movable relative to the body component between an insert orientation of the anchor (FIGS. 1, 4 and 7) and a retention orientation of the anchor (FIGS. 5, 6 and 8). In the insert orientation, a set of retention arms 34 (three arms 34 are shown in the illustrated embodiment, but the number of arms could be one, two or greater than three) formed unitary with the body component 14 lie closely adjacent to the externally threaded portion 16 of the wall penetrating component 12. The retention arms 34 may also include internal thread portions that interact with the thread of the externally threaded portion 16. Thus, in the insert orientation, the tubular portion 32, with retention arms 34 collapsed, is of a relatively uniform shape to facilitate insertion through an opening in the wallboard as may be created by rotation of the wall penetrating component when the pointed end 22 is engaged with the wall. The head part 20 is sized to produce a hole in the wall that is just large enough to allow the tubular portion 32 to pass through, but not large enough to allow the wall face engaging portion 30 to pass through. Here, the wall face engaging portion 30 is formed as an annular flange with a set of ribs 36 at the rear side for biting into the wallboard 100.

The free ends of the arms 34 face toward the head portion 20 when the anchor is in the insert orientation. For the purpose of installation, a tool is inserted within an opening 40 at the end of the body component when the anchor is in the insert orientation and the tool is engaged with the tool receiving part of the internal end 26 of the wall penetrating component. The pointed end 22 is positioned against the external surface 102 of the wallboard 100 and the tool is rotated in the clockwise direction (when viewed from the front side of the wall) to rotate the wall penetrating component and the body component together in the clockwise direction for wall penetration. During such rotation a force is also applied by the tool toward the wall and the wall penetrating component creates a hole in the wallboard 100 to enable movement of both the wall penetrating component 12 and the body component 14 into the wallboard 100 until the wall engaging portion 30 of the body component engages the wall (per FIG. 4) and limits further rotation of the body component 14. In this regard, once the head 20 passes through the wallboard, the tubular portion may quickly slide through the created opening to seat the flange 30 against the wall face so that the ribs 36 bite into the wallboard. Continued clockwise rotation of the tool causes the wall penetrating component 12 to continue to rotate such that interacting threads of the wall penetrating component 12 and the body component 14 pull the wall penetrating component further into the body component (e.g., back toward the wall). As the wall penetrating component 12 is pulled further into the body component 14, the retention arms 34 are expanded outwardly behind a rear surface of the wallboard (e.g., as the enlarged head 20 moves within the arms 34 and pushes them outward) for retaining the hollow wall anchor within the wall (FIG. 5).

Once the anchor 10 is fully installed, the tool can be removed and then a threaded fastener (e.g., screw or bolt) can be moved into the anchor and threaded into the internal passage 28 in order to secure a desired structure (e.g., a shelf, a bracket or other structure) to the wall. Notably, the threaded fastener also rotates into the passage 28 via clockwise rotation. Thus, in the event the threaded fastener reaches the end of the passage 28, preventing further rotation of the fastener relative to the wall penetrating component 12, applying additional rotational force to the fastener will tend to rotate the wall penetrating component 12 further clockwise, which tends to lock the anchor even more to the wall by causing further expansion of the arms 34.

Removal of the anchor 10 from the wall is achieved by initial removal of any inserted fastener. The tool can then be moved into the anchor, engaged with the internal end 26 and then rotated counterclockwise. With some force applied toward the wall during such tool rotation, the portion 30 of the body component 14 remains engaged with the wall and prevents rotation of the body component 14. Thus, only the wall penetrating component 12 rotates counterclockwise, thereby moving out of the body component as a result of the thread interaction between the components. Eventually, the wall penetrating component 12 completely separates from the body component 14 and falls inside of the wall. The tool can then be removed and the body component 14 pulled out of the wall, with the arms 34 moving back into a collapsed position during withdrawal from the wall.

Referring now to FIGS. 9-16, another embodiment of an anchor 210 is shown, somewhat similar to anchor 10. Anchor 210 includes a wall penetrating component 212 and a body component 214. The wall penetrating component includes an externally threaded inner end portion 216 and a wall penetrating distal end portion 218. The wall penetrating end portion 218 includes an enlarged head part 220 and a pointed end 222. A transition region 224 between the pointed end 222 and the enlarged head part 220 is shaped to facilitate wall penetration. The end portion 216 includes an internal end 226 that has a tool receiving part shaped to enable rotation via a tool (e.g., a hex shape recess, Phillips recess, Torx recess or some other shape). The internal end 226 leads to an internal passage 228 that is also threaded.

The body component 214 has a wall face engaging portion 230 at one end and an internally threaded tubular portion 232 extending therefrom. The tubular portion 232 receives the externally threaded portion 216 of the wall penetrating component via the mating threads of the two components. The wall penetrating component 212 is movable relative to the body component between an insert orientation of the anchor (e.g., FIGS. 9 and 10) and a retention orientation of the anchor (e.g., FIG. 13). In the insert orientation, a set of retention arms 234 of the tubular portion 232 (six arms 234 are shown in the illustrated embodiment, but the number of arms could vary as above) formed unitary with the body component 214 lie closely adjacent to the externally threaded portion 216 of the wall penetrating component 212. The retention arms 234 may also include internal thread portions that interact with the thread of the externally threaded portion 216. Thus, in the insert orientation the tubular portion 232, with collapsed retention arms 234, is of a relatively uniform shape to facilitate insertion through an opening in the wallboard as may be created by rotation of the wall penetrating component when the pointed end 222 is engaged with the wall. The head part 220 is sized to produce a hole in the wall that is just large enough to allow the tubular portion 232 to pass through, but not large enough to allow the wall face engaging portion 230 to pass through. In one example, the head part has an outer dimension just slightly larger than the outer dimension of the tubular portion 232 when in its insert orientation, which enables the tubular portion to slip through the wall opening created by the head part 220.

Figure 11:
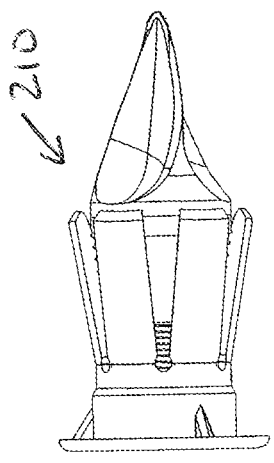
Figure 12:
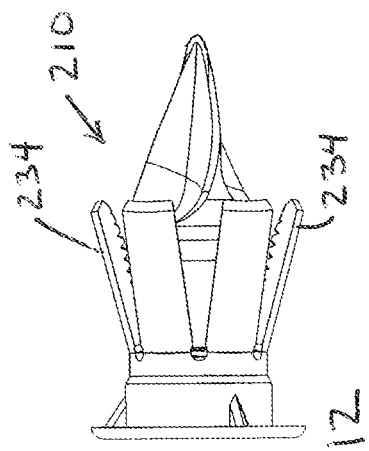
Figure 13:
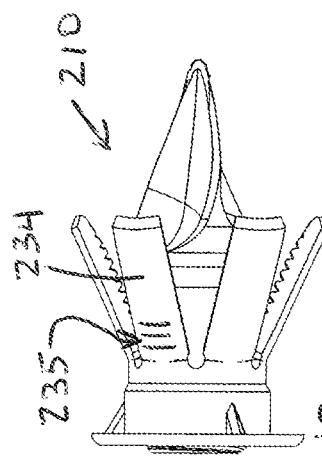
Figure 19:
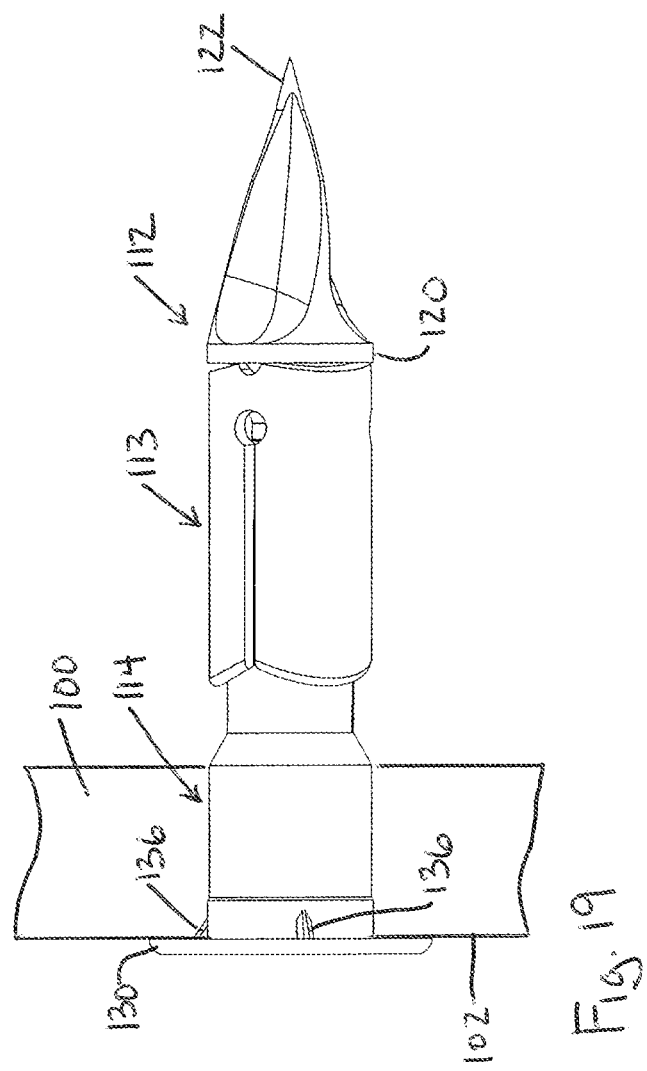
Figure 29:
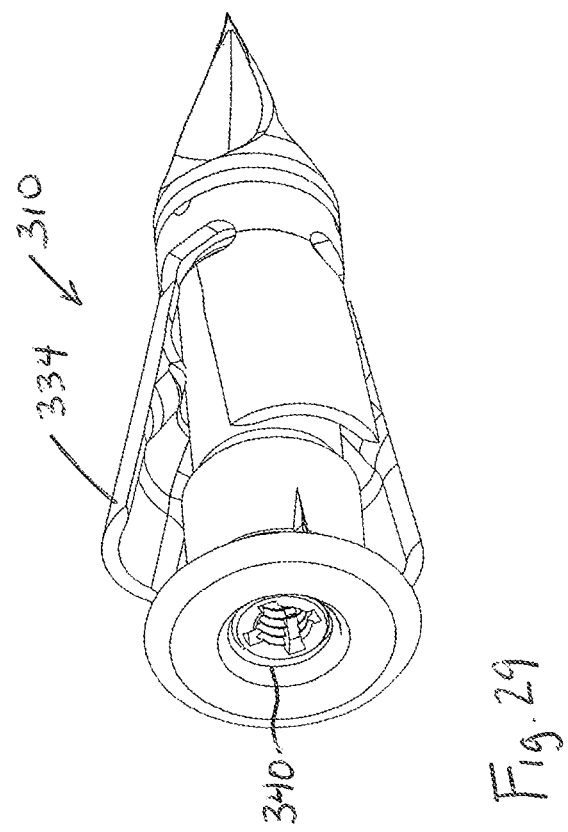
Figure 30:
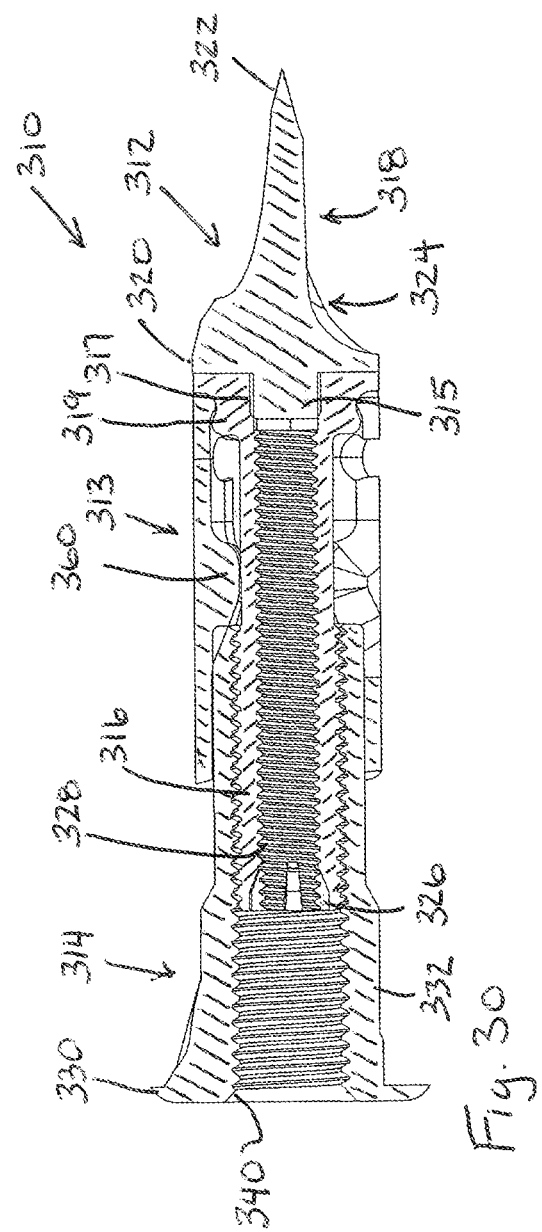

Here, the wall face engaging portion 230 is formed as an annular flange with a set of ribs 236 at the rear side for biting into the wallboard 100. The ribs 236 may have a sharp edge suitable for sufficiently slicing into wallboard material while still allowing the flange to seat against the wallboard surface. The free ends of the arms 234 face toward the head portion 220 when the anchor is in the insert orientation. FIGS. 11-13 show progressive expansion of the arms 234 as the head part is pulled within the arms.

Anchor 210 differs from anchor 10 in a number of ways. In particular, each of the slots between arms 234 of anchor 210, as well as each of the arms 234, is longer than in the case of the slots and arms 34 in anchor 10, which may facilitate installation in a larger variety of wallboard thicknesses. Moreover, as seen in FIGS. 14-16, the wall penetrating component 212 is of a two-piece configuration, with a distal tip part 213 having a boss 215 that inserts within an opening 217 of an internally threaded part 219. For example, a releasable friction fit between the boss 215 and opening 217 may be provided, or a keyed connection may be used for rotational drive purposes.

Installation of anchor 210 may be similar to the above-described installation of anchor 10. In use, the two-piece nature of the wall penetrating component 212 allows longer screws to be used if desired. In particular, once the anchor is secured in place in a wall, if a long screw is threaded into opening 228, the end of the screw may eventually reach and engage with the boss 215, which pushes the tip portion 213 away from portion 219 causing the tip portion 213 to separate and fall within the wall.

In some implementations, the anchor 10 or 210 may have ribbed features on the outer surfaces of the arms 34 or 234 near the connected end of the arms (e.g., as suggested by feature 235 in FIG. 13), which would increase friction forces against the interior wall surface when the arms are expanded, potentially increasing the load rating of the anchor in both shear and tension.

Referring now to FIGS. 17-23, an alternative embodiment of an anchor 110 is shown, which includes a wall penetrating component 112, a body component 114 and a sleeve component 113. The wall penetrating component 112 includes an externally threaded inner end portion 116 and a wall penetrating distal end portion 118. The wall penetrating end portion 118 includes an enlarged head part 120 and a pointed end 122. A transition region 124 between the pointed end 122 and the enlarged head part 120 may be shaped similar to the transition region 24 described above. The end portion 116 includes an internal end 126 that has a tool receiving part shaped to enable rotation via a tool (e.g., a hex shape recess, Phillips recess, Torx recess or some other shape). The internal end 126 leads to an internal passage 128 that is also threaded.

The body component 114 has a wall face engaging portion 130 at one end and an internally threaded tubular portion 132 extending therefrom. The tubular portion 132 receives the externally threaded portion 116 of the wall penetrating component via the mating threads of the two components. The wall penetrating component 112 is movable relative to the body component 114 between an insert orientation of the anchor (FIGS. 18 and 19) and a retention orientation of the anchor (FIGS. 20 and 21). The sleeve 113 is disposed about respective portions of both the body component 114 and wall penetrating component 122, and moves along the body component toward portion 130 in order to transition between the insert orientation and retention orientation of the anchor 110.

In the insert orientation of the anchor 110, a set of retention arms 134 (three arms 34 are shown in the illustrated embodiment, but the number of arms could be one, two or greater than three) formed unitary with the sleeve 113 lie closely adjacent to a reduced diameter end segment 150 of tubular portion 132 of the body component. Thus, in the insert orientation a larger diameter segment 152 of the tubular portion 132 and the sleeve 113 have a similar diameter to facilitate insertion through an opening in the wallboard 100 as may be created by rotation of the wall penetrating component when the pointed end 122 is engaged with the wall. The head part 120 is sized to produce a hole in the wall that is just large enough to allow the sleeve 113 and tubular segment 152 to pass through, but not large enough to allow the wall face engaging portion 130 to pass through (e.g., head may be the same dimension as, or slightly larger in outer dimension than, the tubular segment 152). As above, here the wall face engaging portion 130 is formed as an annular flange with a set of ribs 136 at the rear side for biting into the wallboard 100.

The free ends of the arms 134 face toward the wall face engaging portion 130 when the anchor is in the insert orientation. For the purpose of installation, a tool is inserted within an opening 140 at the end of the body component when the anchor is in the insert orientation and the tool is engaged with the tool receiving part of the internal end 126 of the wall penetrating component 112. The pointed end 122 is positioned against the external surface 102 of the wallboard 100 and the tool rotated in the clockwise direction (when viewed from the front side of the wall) to rotate the wall penetrating component and the body component together in the clockwise direction for wall penetration. During such rotation a force is also applied by the tool toward the wall and the wall penetrating component 114 creates a hole in the wallboard 100 to enable movement of the wall penetrating component 112, the sleeve 113 and the body component 114 into the wallboard 100 until the wall face engaging portion 130 of the body component engages the wall (per FIG. 11) and the ribs 136 bite into the wallboard to limit further rotation of the body component 114. Continued clockwise rotation of the tool causes the wall penetrating component 112 to continue to rotate such that interacting threads of the wall penetrating component 112 and the body component 114 pull the wall penetrating component further into the body component (e.g., back toward the wall). As the wall penetrating component 112 is pulled further into the body component 114, a shoulder 120A of one side of the head part 120 engages and moves the sleeve 113 toward the larger tubular segment 152. A protruding inwardly extending ramp feature 160 located toward the connected end of each of the arms 134 will ride up onto the tubular end segment 150 causing the retention arms 134 to expand outwardly behind the rear surface of the wall for retaining the hollow wall anchor within the wall (FIG. 20).

Once the anchor 110 is fully installed, the tool can be removed and then a threaded fastener (e.g., screw or bolt) can be moved into the anchor and threaded into the internal passage 128 in order to secure a desired structure (e.g., a shelf, a bracket or other structure) to the wall. Notably, the threaded fastener also rotates into the passage 128 via clockwise rotation. Thus, in the event the threaded fastener reaches the end of the passage 128, preventing further rotation of the fastener relative to the wall penetrating component 112, applying additional rotational force to the fastener will tend to rotate the wall penetrating component 112 further clockwise, which tends to lock the anchor even more to the wall by causing further expansion of the arms 134.

Removal of the anchor 110 from the wall is achieved by initial removal of any inserted fastener. The tool can then by moved into the anchor, engaged with the internal end 126 and then rotated counterclockwise. With some force applied toward the wall during such tool rotation, the portion 130 of the body component 114 remains engaged with the wall and prevents rotation of the body component 114. Thus, only the wall penetrating component 112 rotates counterclockwise, thereby moving 112 out of the body component 114 as a result of the thread interaction between the components. Eventually the wall penetrating component 112 completely separates from the body component 114 and falls inside of the wall. The tool can then be removed and the body component 114 pulled out of the wall, with the sleeve 113 sliding off of the body component 114 and also falls inside of the wall.

Referring now to FIGS. 24-31, an alternative embodiment of an anchor 310 is shown, which includes a wall penetrating component 312, a body component 314 and a sleeve component 313. The wall penetrating component 312 includes an externally threaded inner end portion 316 and a wall penetrating distal end portion 318. The wall penetrating end portion 318 includes an enlarged head part 320 and a pointed end 322. A transition region 324 between the pointed end 322 and the enlarged head part 320 may be shaped similar to the transition regions described above. The end portion 316 includes an internal end 326 that has a tool receiving part shaped to enable rotation via a tool (e.g., a hex shape recess, Phillips recess, Torx recess or some other shape). The internal end 326 leads to an internal passage 328 that is also threaded.

The body component 314 has a wall face engaging portion 330 at one end and an internally threaded tubular portion 332 extending therefrom. The tubular portion 332 receives the externally threaded portion 316 of the wall penetrating component via the mating threads of the two components. The wall penetrating component 312 is movable relative to the body component 314 between an insert orientation of the anchor (FIGS. 24 and 30) and a retention orientation of the anchor (FIGS. 26-29). The sleeve 313 is disposed about respective portions of both the body component 314 and wall penetrating component 312, and moves along the body component toward portion 330 when transitioning between the insert orientation and retention orientation of the anchor 310.

In the insert orientation of the anchor 310, a set of retention arms 334 (three arms 334 are shown in the illustrated embodiment, but the number of arms could be one, two or greater than three) formed unitary with the sleeve 313 lie closely adjacent to a reduced diameter end segment 350 of portion 332 of the body component. Thus, in the insert orientation, a larger diameter segment 352 of the tubular portion 332 and the sleeve 313 have a similar diameter to facilitate insertion through an opening in the wallboard 100 as may be created by rotation of the wall penetrating component when the pointed end 322 is engaged with the wall. The head part 320 is sized to produce a hole in the wall that is just large enough to allow the sleeve 313 and tubular segment 352 to pass through, but not large enough to allow the wall engaging portion 330 to pass through (e.g., head may be the same dimension as, or slightly larger in outer dimension than the tubular segment 352). As above, here the wall face engaging portion 330 is formed as an annular flange with a set of ribs 336 with sharp distal edges at the rear side for biting into the wallboard 100.

The free ends of the arms 334 face toward the wall engaging portion 330 when the anchor is in the insert orientation. Installation of the anchor 310 is similar to that described above for anchor 110, with arms 334 including an internal ramp feature 360 to cause arm expansion as the tubular sleeve 313 is moved toward the wall engaging part 330.

FIGS. 26-28 demonstrate that the anchor 310 is suitable for installation in wallboard having a variety of different thicknesses, which is also true for the anchor 110 described above. In both cases, the arms of the tubular sleeve expand outward quickly, and then the tubular sleeve simply moves closer to portion 330 for wallboards of reduced thickness, which requires nothing more than a bit more rotation of the component 312 (e.g., using a tool is inserted within an opening 340 at the end of the body component).

Anchor 310 is different than anchor 110 in a number of ways. In particular, the wall penetrating component 312 is of a two-piece configuration, with a distal tip part 313 having a boss 315 that inserts within an opening 317 of an internally threaded part 319. For example, a releasable friction fit between the boss 315 and opening 317 may be provided, or a keyed connection may be used for rotational drive purposes. The two-piece nature of the wall penetrating component 312 allows longer screws to be used if desired. In particular, once the anchor is secured in place in a wall, if a long screw is threaded into opening 328 the end of the screw may eventually reach and engage with the boss 315, which pushes the tip portion 313 away from portion 319 causing the tip portion 313 to separate and fall within the wall, even while the anchor 310 remains suitable for use.

In the case of anchor 310, an enlarged slot shape 370 is provided between adjacent arms 334 at their connection ends to reduce stresses as compared to the smaller opening at the similar location in anchor 110.

Figure 31:
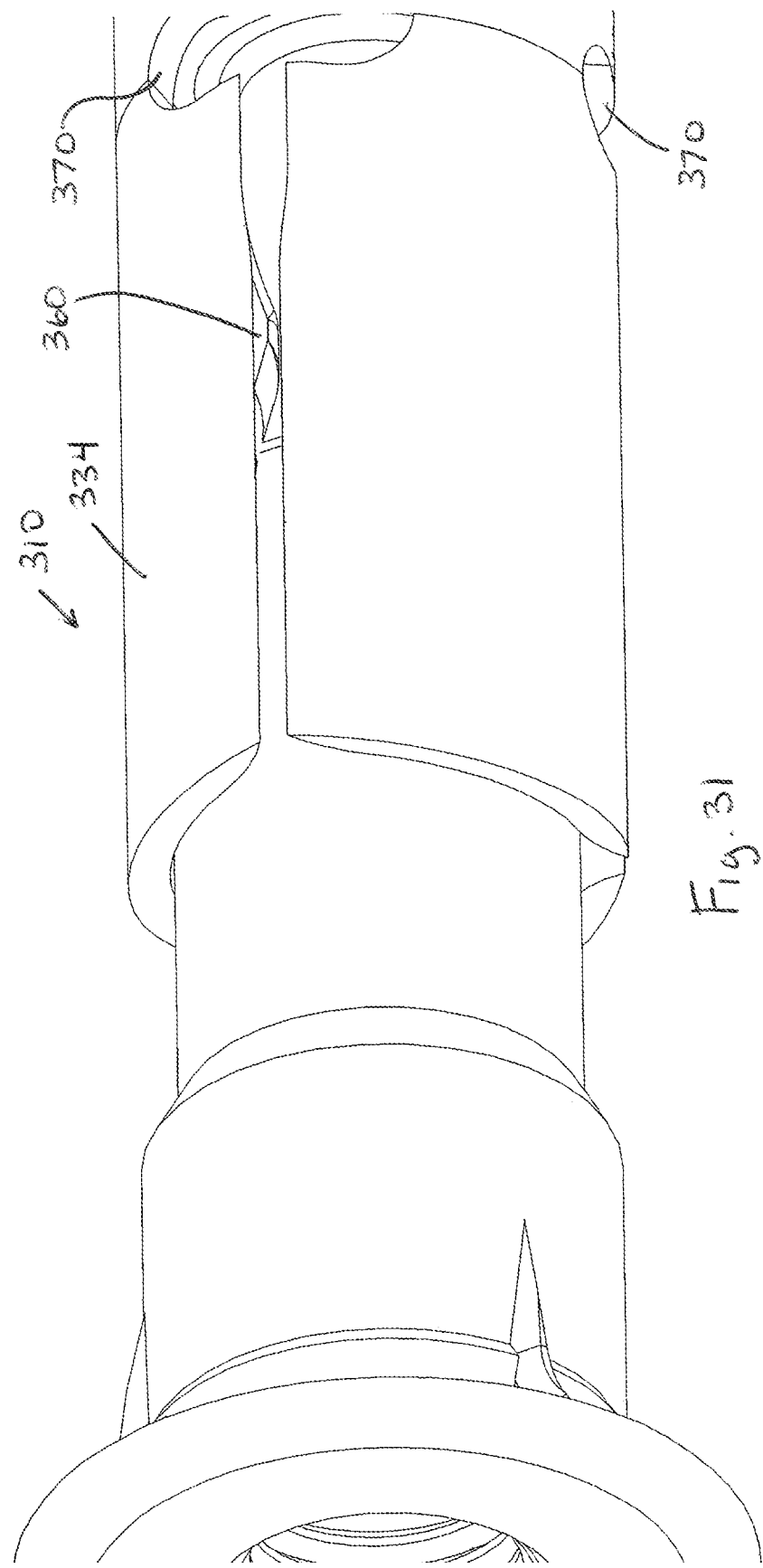
Figure 32:
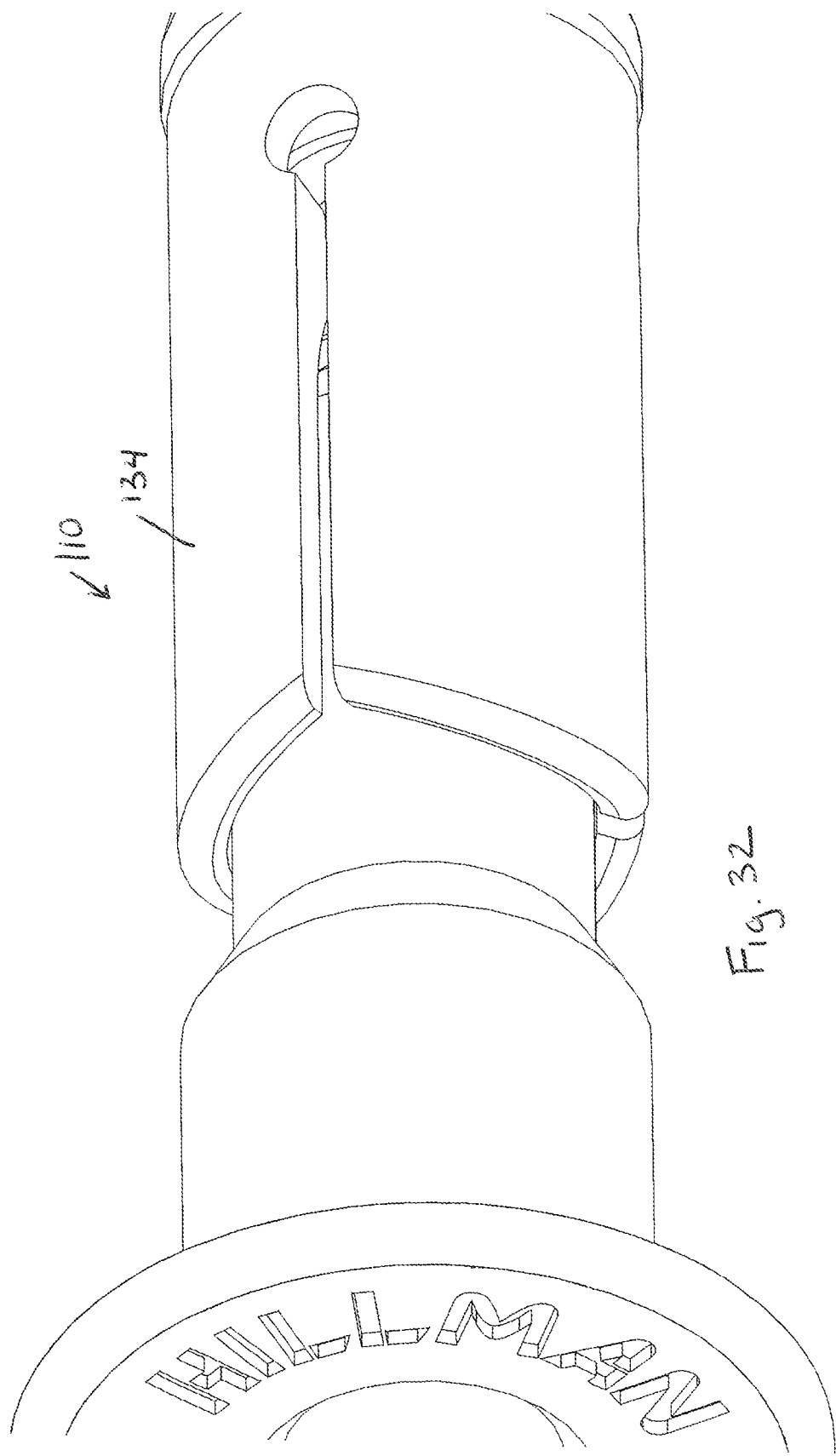
FIG. 32 shows an enlarged partial view of the anchor of FIG. 1.

Notably, the free ends of the arms 334 of anchor 310 are curved as seen in the side view of FIG. 24, which is also true for arms 134 of anchor 110. However, as best seen in FIGS. 31 and 32 showing views of anchors 310 and 110 respectively, the free ends of the arms 134 are curved so as to provide a flat surface that will be pulled into contact with the inner surface of the wallboard, whereas the free ends of arms 334 are straight or flat so that the corners will be pulled into contact with the inner surface of the wallboard, which causes the arm ends to bite into the surface.

Figure 33:
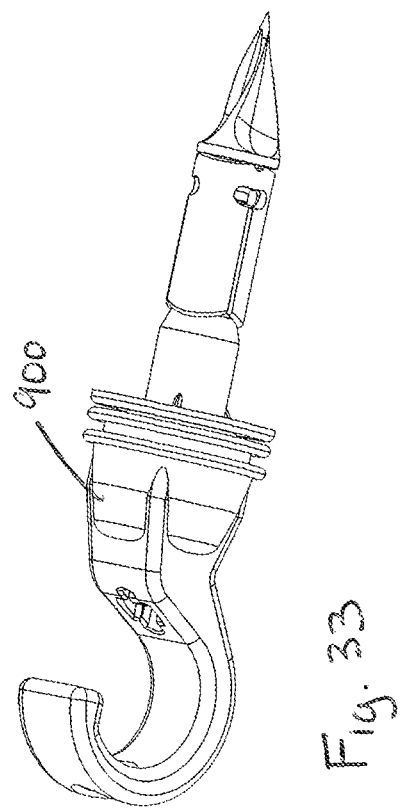
FIGS. 33 and 34 show anchor embodiments with an incorporated hook member.
Figure 34:
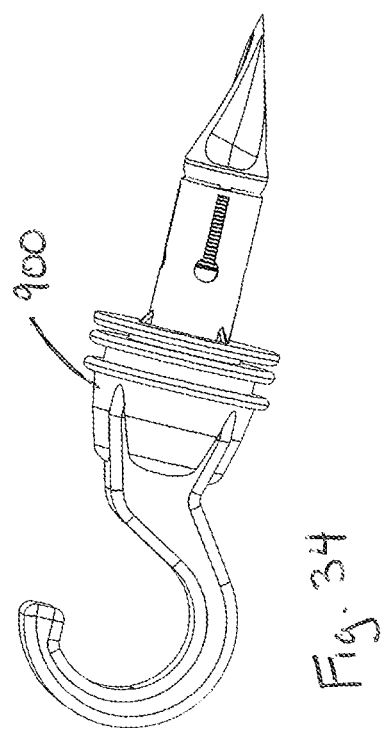
Figure 35:
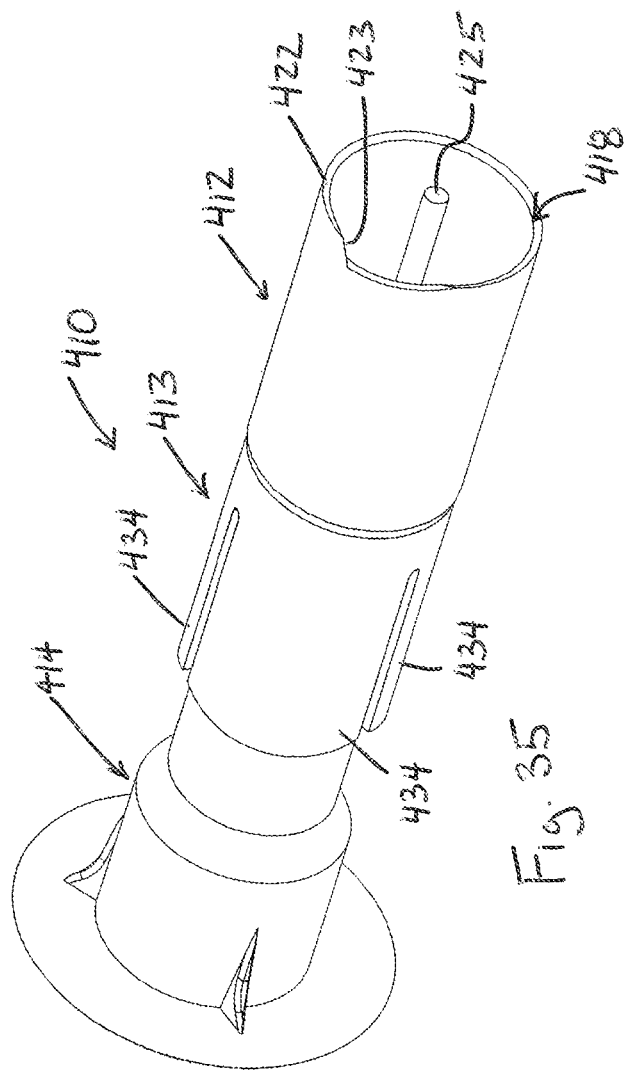
FIGS. 35-39 show another embodiment of an anchor.
Figure 36:
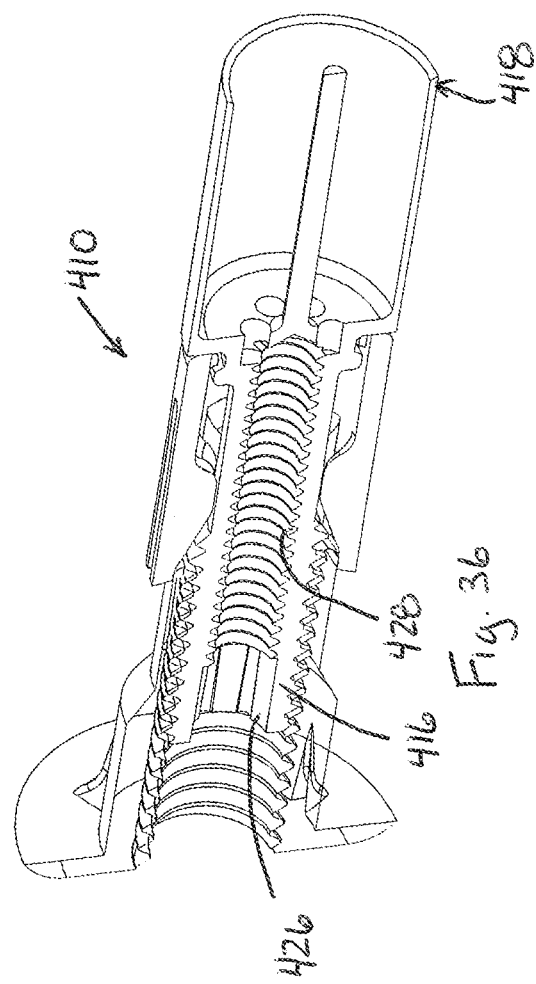
Figure 37:
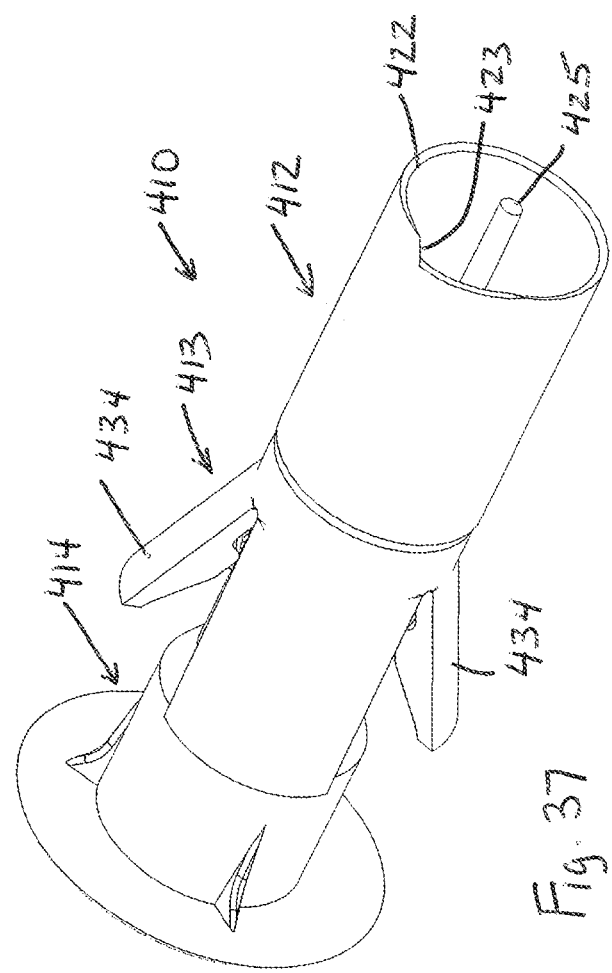
Figure 38:
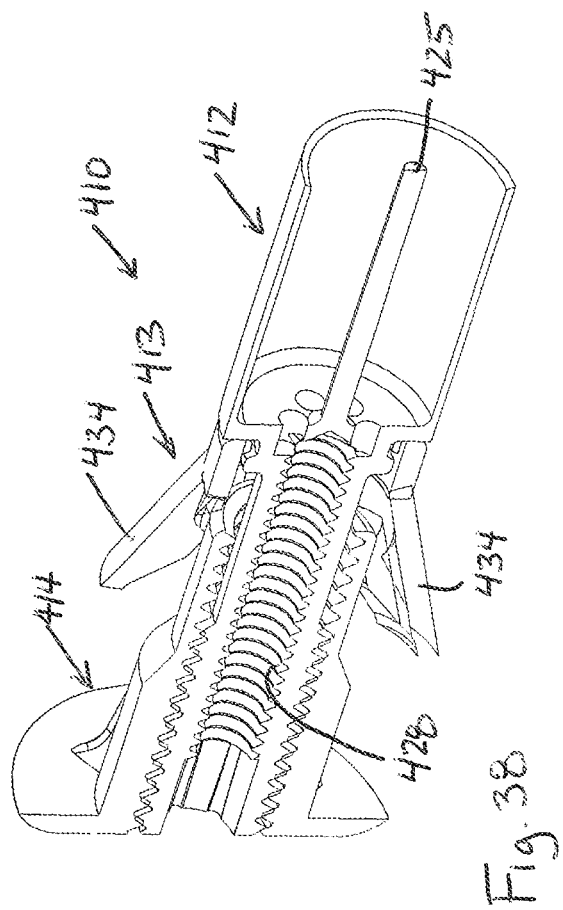
Figure 39:
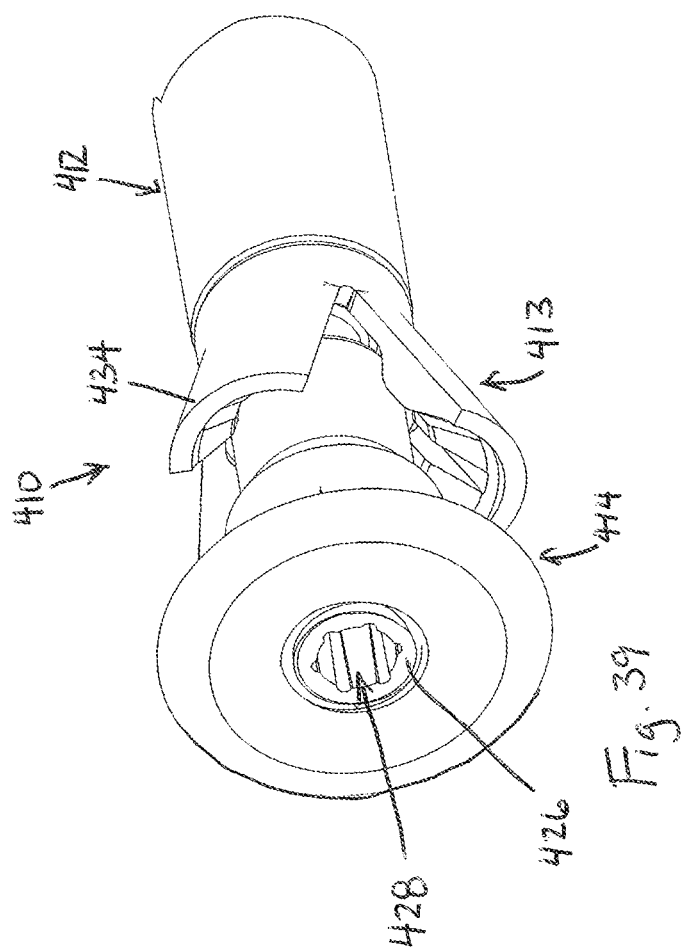

As shown in FIGS. 33 and 34, a hook assembly 900 or other structure may be incorporated into the anchor component such that the hook or other structure is used to rotate the anchor for wall insertion and removal. Moreover, a variety of alternate tip configurations are possible. To achieve the same benefit as the removable tip so that longer screws can be used with the assembly while also being more manufacturable as a single part, tip configurations could be hollow, or tips could be configured to split as the screw contacts the back side or tips could be configured to fracture at the end and allow the screw to be installed.

Anchors having tips with a coring feature could also be provided. In this regard, referring to FIGS. 35-39, an anchor 410 including a wall penetrating component 412, a body component 414 and a sleeve component 413 is shown. The wall penetrating component 412 includes an externally threaded inner end portion 416 and a wall penetrating end portion 418. The wall penetrating end portion 418 includes a cylindrical distal end 422 defining an edge for engaging wallboard and cutting the wallboard during rotation. To facilitate such cutting, one or more cutting teeth or steps 423 may be provided at the end edge. In addition, a centering/stabilizing pin 425 may be provided and may push slightly into the wallboard before rotation of the anchor and wallboard cutting begins. The end portion 416 includes an internal end 426 that has a tool receiving part shaped to enable rotation via a tool (e.g., a hex shape recess, Phillips recess, Torx recess or some other shape). The internal end 426 leads to an internal passage 428 that is also threaded along at least part of its length for reasons described above. Sleeve 413 includes expandable retention arms 434. The operation of anchor 410 is similar to anchor 110 above, except that the wall penetrating component 412 cores a hole in the wallboard during initial rotation of the anchor for installation and, in some cases, the removed core may be trapped in the end of cylindrical distal end 422.

Figure 40:
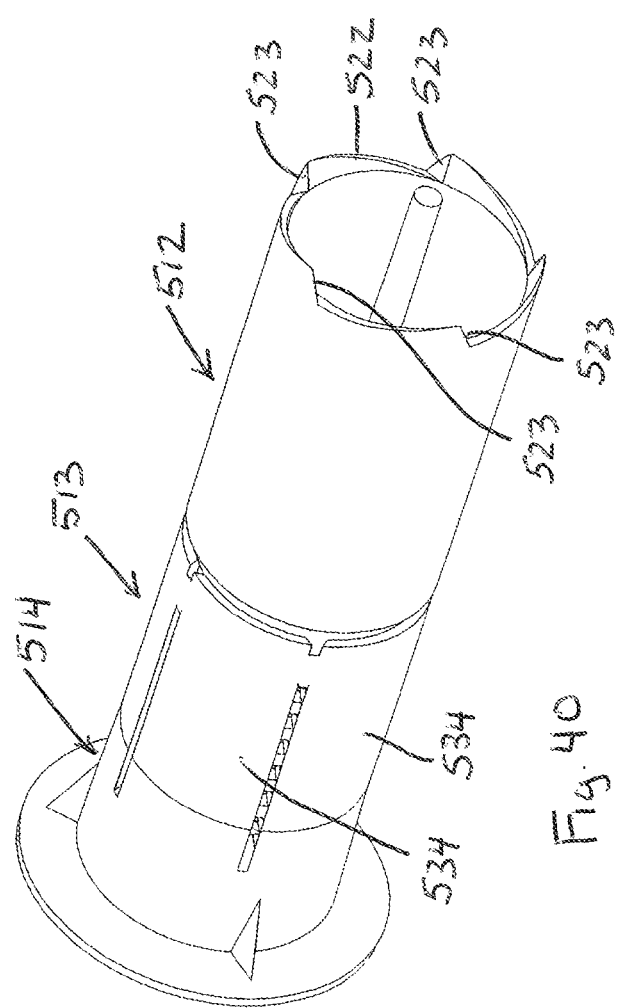
FIGS. 40-41 show another embodiment of an anchor.
Figure 41:
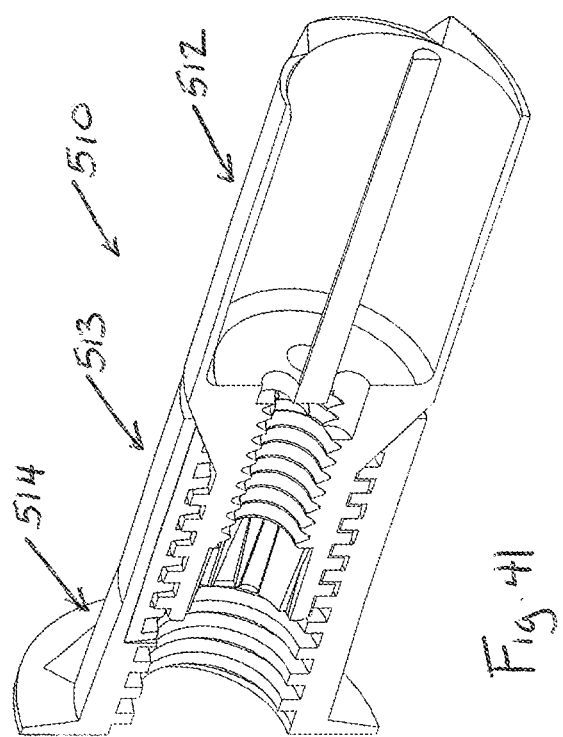

FIGS. 40-41 show an anchor 510 with a body component 514, sleeve component 513 with expandable arms 534, and a wall penetrating component 512 that includes a cylindrical end 522 that includes five cutting teeth or steps 523.

Figure 42:
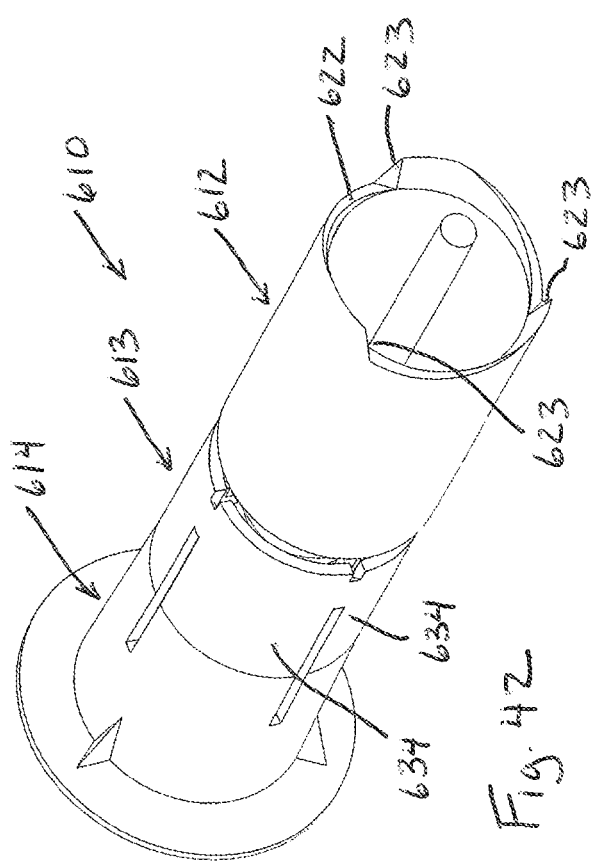
FIGS. 42-43 show another embodiment of an anchor.
Figure 43:
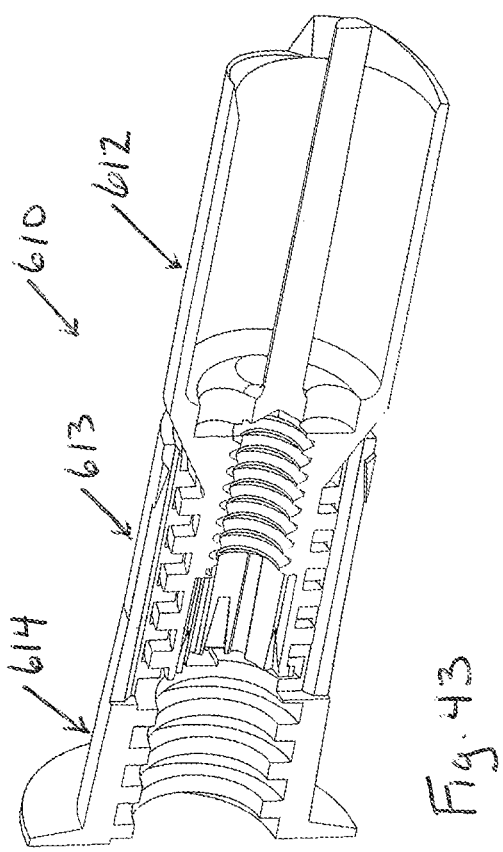

FIGS. 42-43 show an anchor 610 with a body component 614, sleeve component 613 with expandable arms 634, and a wall penetrating component 612 that includes a cylindrical end 622 that includes three cutting teeth or steps 623.

Figure 44:
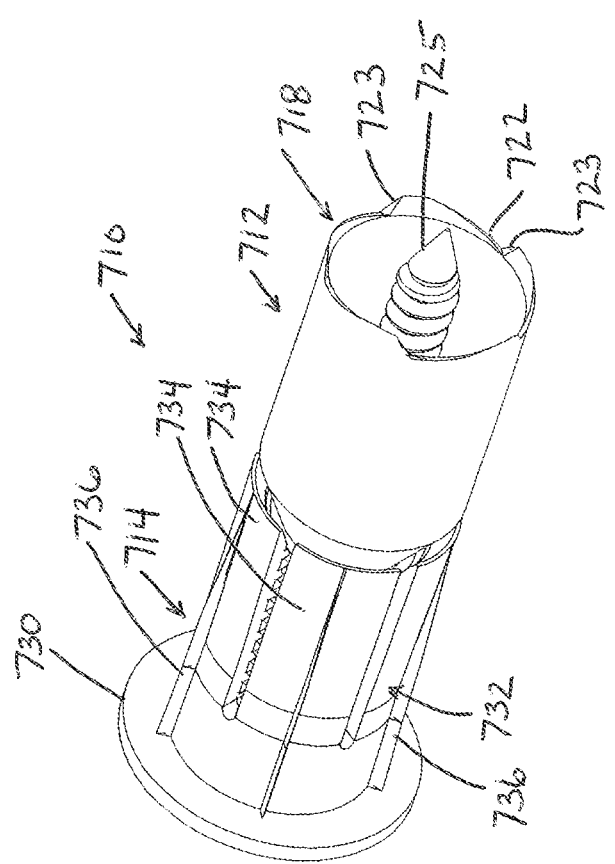
FIGS. 44-46 show another embodiment of an anchor.
Figure 45:
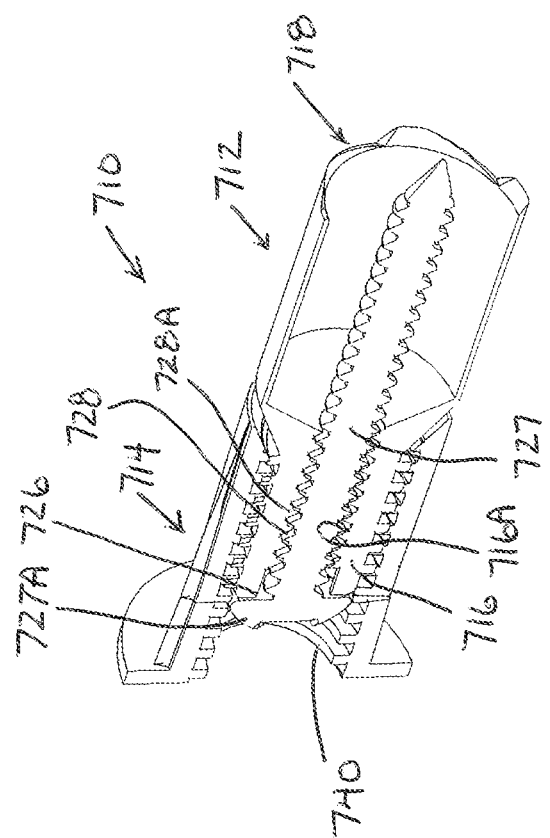
Figure 46:
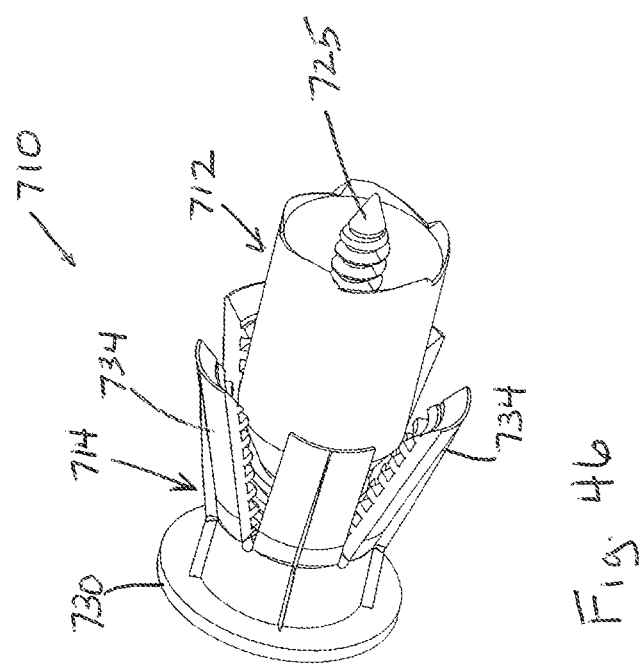
Figure 47:
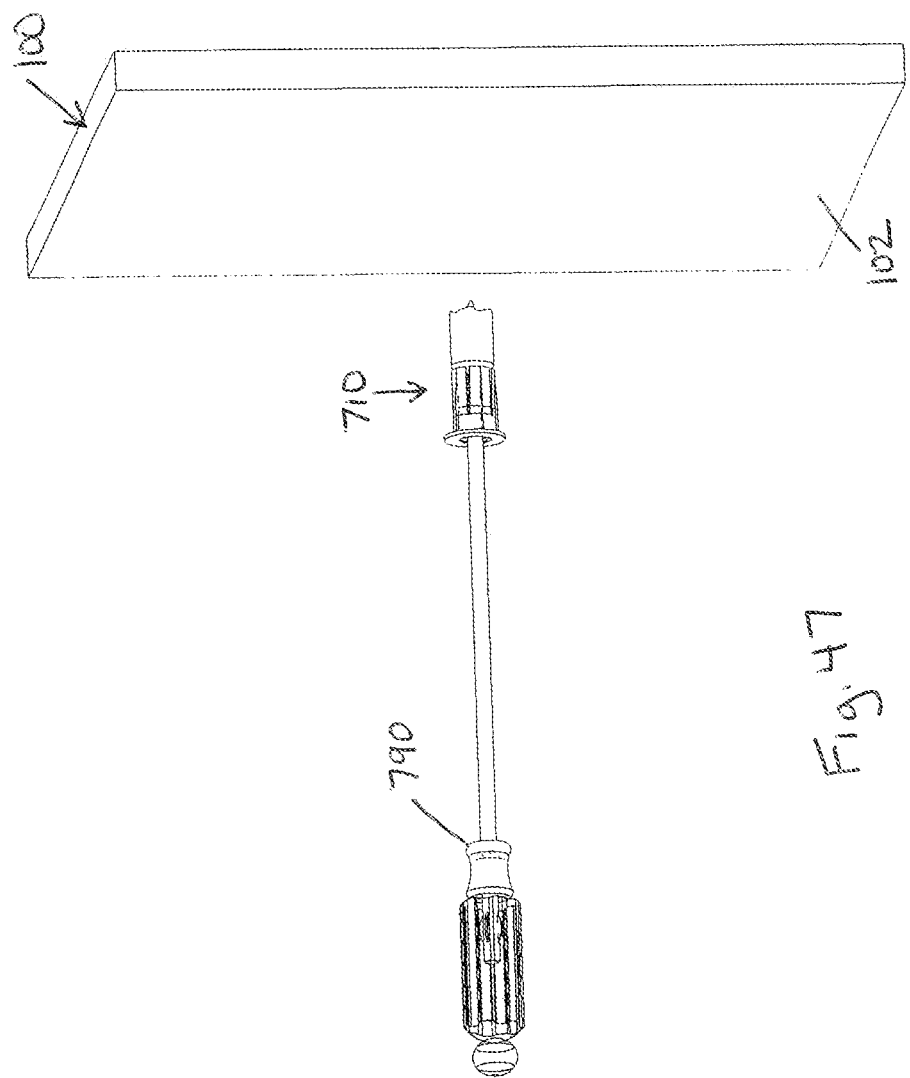

Referring now to FIGS. 44-46, another hollow wall anchor 710 is shown, which includes a wall penetrating component 712 and a body component 714. By way of example, component 712 may be of metal construction to facilitate wall cutting/boring, and component 714 may be of plastic or metal. The wall penetrating component 712 includes an externally threaded inner end portion 716, with thread 716A, and a wall penetrating distal end portion 718. The wall penetrating end portion 718 includes a cylindrical distal end 722 defining an edge for engaging wallboard and cutting the wallboard during rotation. To facilitate such cutting, one or more cutting teeth or steps 723 may be provided at the end edge. In this anchor 710, a centering/stabilizing pin 725 is formed by the distal pointed end of a removable screw 727, and may push slightly into the wallboard before rotation of the anchor and wallboard cutting begins. The end portion 716 includes an internal end 726 that has a tool receiving part shaped to enable rotation via a tool (e.g., a hex shape recess, Phillips recess, Torx recess or some other shape). The internal end 726 leads to an internal passage 728 that is also threaded, per thread 728A.

The body component 714 has a wall face engaging portion 730 at one end and an internally threaded tubular portion 732 extending therefrom. The tubular portion 732 receives the externally threaded portion 716 of the wall penetrating component via the mating threads of the two components. The wall penetrating component 712 is movable relative to the body component between an insert orientation of the anchor (FIGS. 44 and 45) and a retention orientation of the anchor (FIG. 46). In the insert orientation, a one or more retention arms 734 (the number of which can vary as explained for prior embodiments) formed unitary with the body component 714 lie closely adjacent to the externally threaded portion 716 of the wall penetrating component 712. The retention arms 734 form part of tubular portion 732 and may also include internal thread portions that interact with the thread of the externally threaded portion 716. Thus, in the insert orientation the tubular portion 732, with retention arms 734 in collapsed condition, is of a relatively uniform shape to facilitate insertion through an opening in the wallboard as may be created by rotation of the wall penetrating component when the cutting end 722 is engaged with the wall. The free ends of the arms 734 face toward the cutting end 722 when the anchor is in the insert orientation. The tubular end of component 712 is sized to produce a hole in the wall that is just large enough to allow the tubular portion 732 to pass through, but not large enough to allow the wall face engaging portion 730 to pass through. Here, the wall face engaging portion 730 is formed as an annular end flange with a set of ribs 736 at the rear side (or wall facing side) for biting into the wallboard. An end opening 740 in portion 730 provide access to the interior of the anchor, including the screw head 727A engaged with the internal end 726 of component 712.

For the purpose of installation, and referring to FIGS. 47-53, a tool (here the end of a screwdriver 790) is inserted within the opening 740 at the end of the body component 714 when the anchor is in the insert orientation and while the screw 727 is internal of the anchor. The tool is engaged with the head of the screw, and the pointed end 725 of the screw is moved into contact with the external surface 102 of the wall 100 to stabilize a desired install position of the anchor 710. The tool 790 is then rotated in the clockwise direction (when viewed from the front side of the wall) to rotate the wall penetrating component and the body component together in the clockwise direction for wall penetration. During such rotation a force is also applied by the tool toward the wall and the wall penetrating component 712 bores a hole in the wallboard 100 (per FIGS. 48 and 49) to enable movement of both the wall penetrating component 712 and the body component 714 into the wallboard 100 until the wall engaging portion 730 of the body component engages the wall (per FIGS. 50 and 51) and limits further rotation of the body component 14. In this regard, once the head component 712 completes the bore entirely through the wallboard, the tubular portion of component 714 may quickly slide through the created opening to seat the flange 730 against the wall face so that the ribs bite into the wallboard.

Continued clockwise rotation of the tool causes the wall penetrating component 712 to continue to rotate such that interacting threads of the wall penetrating component 712 and the body component 714 pull the wall penetrating component 712 further into the body component (e.g., back toward the wall per FIG. 51). As the wall penetrating component 712 is pulled further into the body component 714, the retention arms 734 are expanded outwardly behind a rear surface of the wallboard (e.g., as the enlarged tubular end of component 712 moves within the arms 734 and pushes them outward) for retaining the hollow wall anchor within the wall. In this position, the head 727A of the screw may be moved to the forward or front side of the anchor as shown.

Once the anchor 710 is fully installed, the tool can be rotated counterclockwise to remove the screw from the anchor (per FIG. 52) and then a desired structure 792 (e.g., here a hook) can be placed adjacent the anchor 710 and the threaded fastener 727 can be screwed back into the anchor (per FIG. 53). The screw is threaded back into the internal passage 728 (not shown in FIG. 53) in order to secure the structure (e.g., a hook, a shelf, a bracket or other structure) to the wall.

Referring now to FIGS. 54 and 55, because the screw 727 is used to rotate the anchor 710 into the wall, the anchor may include one or more dimple features 726A at the end face of the end internal 726 of the component 712. The dimple features are raised protrusions that allow the screw to be torqued tightly when securing the anchor into the wall, and provide a low friction contact with the screw head 727A, which enables the screw 727 to be loosened to remove the screw for use without sacrificing the tight grip that the anchor has on the wall material.

To remove the anchor 710 from the wall, the screw 727 is removed. Then the tool can be inserted into the end of the anchor and engaged with the internal end 726 to rotate the component 712 back out of the component 714 until component 712 drops within the wall, at which point component 714 can slide out of the opening in the wall.

It is to be clearly understood that the above description is intended by way of illustration and example only, is not intended to be taken by way of limitation, and that other changes and modifications are possible.

What is claimed is:

1. A hollow wall anchor, comprising:
a wall penetrating component having an externally threaded portion and a wall penetrating end portion;
a body component having a wall face engaging portion and an internally threaded portion that receives the externally threaded portion of the wall penetrating component;
wherein rotation of the wall penetrating component and the body component together in a first direction for wall penetration moves both the wall penetrating component and the body component into the wall until the wall face engaging portion of the body component engages the wall to limit further rotation of the body component while the wall penetrating component continues to rotate such that interacting threads of the wall penetrating component and the body component pull the wall penetrating component further into the body component;
wherein the wall penetrating component includes a cylindrical end edge for coring a hole in wallboard;
wherein a central stabilizing member protrudes beyond the cylindrical end edge;
wherein the central stabilizing member is formed by a removable screw threadedly engaged with the wall penetrating component.

2. The hollow wall anchor of claim 1, wherein:
as the wall penetrating component is pulled further into the body component one or more retention arms are expanded outwardly behind a rear surface of the wall for retaining the hollow wall anchor within the wall.

3. The hollow wall anchor of claim 2, wherein:
the one or more retention arms are integrally formed with, and remain connected to, the body component.

4. The hollow wall anchor of claim 3, wherein:
each retention arm has a free end facing toward the wall penetrating end portion of the wall penetrating component.

5. The hollow wall anchor of claim 4, wherein:
the wall penetrating end portion includes a tubular part with a cylindrical cutting end that defines the cylindrical end edge, and the tubular part moves internally of and engages the one or more retention arms to expand the retention arms outwardly.

6. The hollow wall anchor of claim 2, wherein:
the wall penetrating component includes an internal end within the body component, the internal end including a tool receiving part shaped to enable rotation via a tool,
the body component includes a through passage to provide tool access to the tool receiving part.

7. The hollow wall anchor of claim 6, wherein:
the internal end of the wall penetrating component further includes an internal passage that is threaded and in which the removable screw is threadedly engaged.

8. The hollow wall anchor of claim 6, wherein:
the wall face engaging portion of the body component comprises an end flange for seating against an external surface of the wall and one or more ribs at a rear side of the end flange for biting into the wall.

9. The hollow wall anchor of claim 1 wherein the cylindrical end edge includes one or more cutting teeth.

10. The hollow wall anchor of claim 1 wherein an internal end face of the externally threaded portion includes a plurality of dimples and a head of the removable screw is engaged with the dimples.

11. A hollow wall anchor, comprising:
a wall penetrating component having an externally threaded portion and a wall penetrating end portion;
a body component having a through passage with a forward end and a distal end, wherein at least part of the through passage is internally threaded, wherein the externally threaded portion of the wall penetrating component is received within the distal end of the through passage and threadedly engages the internally threaded part of the through passage, wherein rotation of the wall penetrating component relative to the body component in a first direction pulls the wall penetrating component further into the body component by way of thread interaction; and
a plurality of movable retention arms located along the anchor, each retention arm movable between a collapsed install orientation and an expanded retention orientation, wherein as the wall penetrating component is pulled further into the body component each retention arm is shifted from its collapsed install orientation to its expanded retention orientation;
wherein the forward end of the through passage is defined by an opening that enables access to an inner end of the wall penetrating component such that the wall penetrating component can be engaged and rotated;
wherein the inner end of the wall penetrating component includes an opening to an internally threaded fastener receiving passage within the wall penetrating component.

12. The hollow wall anchor of claim 11 wherein the wall penetrating end portion includes a tubular end edge for coring a hole in wallboard, and a central stabilizing member protrudes outward beyond the tubular end edge.

13. The hollow wall anchor of claim 12 wherein the central stabilizing member is formed by a removable threaded fastener threadedly engaged within the wall penetrating component, where the inner end includes a plurality of protrusions and a head of the screw is engaged with the protrusions.

14. A hollow wall anchor, comprising:
a wall penetrating component having an externally threaded portion and a wall penetrating end portion;
a body component having a wall face engaging portion and an internally threaded portion that receives the externally threaded portion of the wall penetrating component;
wherein rotation of the wall penetrating component and the body component together in a first direction for wall penetration moves both the wall penetrating component and the body component into the wall until the wall face engaging portion of the body component engages the wall to limit further rotation of the body component while the wall penetrating component continues to rotate such that interacting threads of the wall penetrating component and the body component pull the wall penetrating component further into the body component;
wherein the wall penetrating component includes an opening to an internally threaded passage within the wall penetrating component.

15. The hollow wall anchor of claim 14, wherein the wall penetrating component includes a cylindrical end edge.

16. The hollow wall anchor of claim 14, wherein a removable screw is engaged in the internally threaded passage.

17. The hollow wall anchor of claim 14, wherein the internally threaded passage is an axial through passage.

* * * * *